US011632835B2

(12) United States Patent
Raposo et al.

(10) Patent No.: US 11,632,835 B2
(45) Date of Patent: *Apr. 18, 2023

(54) LIGHTING SYSTEM FOR AN ENVIRONMENT AND A CONTROL MODULE FOR USE THEREIN

(71) Applicant: Hayward Industries, Inc., Berkeley Heights, NJ (US)

(72) Inventors: Danny Raposo, Lincoln, RI (US); James Carter, Warren, RI (US); Gregory Fournier, West Kingston, RI (US); James Murdock, Wakefield, RI (US); Kevin Potucek, Naples, FL (US)

(73) Assignee: Hayward Industries, Inc., Berkeley Heights, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/814,289

(22) Filed: Mar. 10, 2020

(65) Prior Publication Data

US 2020/0413521 A1 Dec. 31, 2020

Related U.S. Application Data

(63) Continuation of application No. 16/106,801, filed on Aug. 21, 2018, now Pat. No. 10,588,200, which is a
(Continued)

(51) Int. Cl.
*H05B 45/20* (2020.01)
*G06F 3/038* (2013.01)
(Continued)

(52) U.S. Cl.
CPC ............ *H05B 45/20* (2020.01); *G06F 3/038* (2013.01); *G06F 3/0362* (2013.01);
(Continued)

(58) Field of Classification Search
CPC .... H05B 47/185; H05B 47/155; H05B 47/19; H05B 45/20; H05B 45/10; G06F 3/038; G06F 3/0362
See application file for complete search history.

(56) References Cited

U.S. PATENT DOCUMENTS

| 1,874,513 A | 8/1932 | Hall |
| 1,991,775 A | 2/1935 | Spencer |

(Continued)

FOREIGN PATENT DOCUMENTS

| CA | 2 486 045 A1 | 4/2005 |
| CA | 2 703 933 A1 | 5/2009 |

(Continued)

OTHER PUBLICATIONS

Pentair, "IntelliBrite Controller (For IntelliBrite Pool & Spa)—Installation Guide", Mar. 2014. (11 pages).

(Continued)

*Primary Examiner* — Raymond R Chai
(74) *Attorney, Agent, or Firm* — McCarter & English, LLP

(57) ABSTRACT

Exemplary embodiments of the present disclosure are directed to a lighting system that includes a line control module and light modules. The line control module can be configured to interrupt power to the light modules according to one or more power interruption schemes to control an operation of the light modules. The line control module can have user interface circuitry including a rotary encoder with a shaft and a push button, a preview circuit, and indicator light emitting diodes. A user can interact with the lighting system via the user interface circuitry, which can be configured to provide visual feedback of various settings of the lighting system.

14 Claims, 29 Drawing Sheets

Related U.S. Application Data continuation of application No. 15/050,207, filed on Feb. 22, 2016, now Pat. No. 10,057,964, which is a continuation of application No. 14/790,956, filed on Jul. 2, 2015, now abandoned.

(51) Int. Cl.
- *G06F 3/0362* (2013.01)
- *H05B 47/185* (2020.01)
- *H05B 47/19* (2020.01)
- *H05B 47/155* (2020.01)

(52) U.S. Cl.
CPC ......... *H05B 47/155* (2020.01); *H05B 47/185* (2020.01); *H05B 47/19* (2020.01)

(56) References Cited

U.S. PATENT DOCUMENTS

| | | |
|---|---|---|
| 2,323,793 A | 7/1943 | Clark |
| 2,326,781 A | 8/1943 | Hubacker |
| 2,881,409 A | 4/1959 | Cook |
| 2,903,674 A | 9/1959 | Schwab |
| 3,020,522 A | 2/1962 | Lesher |
| 3,114,127 A | 12/1963 | Ramsey |
| 3,175,184 A | 3/1965 | Shelar |
| 3,213,377 A | 10/1965 | Neale |
| 3,255,433 A | 6/1966 | Lesher |
| 3,257,641 A | 6/1966 | Campana et al. |
| 3,271,734 A | 9/1966 | Cabe et al. |
| 3,435,213 A | 3/1969 | Colbow et al. |
| 3,558,912 A | 1/1971 | Spall |
| 3,594,720 A | 7/1971 | Cane |
| 3,804,049 A | 4/1974 | Greer |
| 3,898,516 A | 8/1975 | Nakasone |
| 3,962,675 A | 6/1976 | Rowley et al. |
| 4,053,758 A | 10/1977 | Shaw |
| 4,097,782 A | 6/1978 | Chambliss |
| 4,135,144 A | 1/1979 | Elmasian |
| 4,155,015 A | 5/1979 | Nakasone et al. |
| 4,215,277 A | 7/1980 | Weiner et al. |
| 4,276,486 A | 6/1981 | Ahuja et al. |
| 4,293,795 A | 10/1981 | Fields |
| 4,298,868 A | 11/1981 | Spurgeon |
| 4,350,903 A | 9/1982 | Jimerson et al. |
| 4,392,187 A | 7/1983 | Bornhorst |
| 4,443,783 A | 4/1984 | Mitchell |
| 4,540,984 A | 9/1985 | Waldman |
| 4,575,660 A | 3/1986 | Zaharchuk et al. |
| 4,634,957 A | 1/1987 | Hollaway |
| 4,636,036 A | 1/1987 | Pasquali |
| 4,649,323 A | 3/1987 | Pearlman et al. |
| 4,695,739 A | 9/1987 | Pierce |
| 4,780,621 A | 10/1988 | Bartleucci et al. |
| 4,814,800 A | 3/1989 | Lavinsky et al. |
| 4,890,208 A | 12/1989 | Izenour |
| 4,924,151 A | 5/1990 | D'Aleo et al. |
| 4,974,133 A | 11/1990 | Fujiki |
| 5,030,890 A | 7/1991 | Johnson |
| 5,045,978 A | 9/1991 | Gargle |
| 5,045,983 A | 9/1991 | Shields |
| 5,051,875 A | 9/1991 | Johnson |
| 5,073,745 A | 12/1991 | Kakitani |
| 5,126,634 A | 6/1992 | Johnson |
| 5,126,636 A | 6/1992 | Masaki |
| 5,128,595 A | 7/1992 | Hara |
| 5,143,439 A | 9/1992 | Lewis et al. |
| 5,170,068 A | 12/1992 | Kwiatkowski et al. |
| 5,191,265 A | 3/1993 | D'Aleo et al. |
| 5,209,560 A | 5/1993 | Taylor et al. |
| 5,220,464 A | 6/1993 | Lin |
| 5,248,919 A | 9/1993 | Hanna et al. |
| 5,254,910 A | 10/1993 | Yang |
| 5,256,948 A | 10/1993 | Boldin et al. |
| 5,294,849 A | 3/1994 | Potter |
| 5,319,531 A | 6/1994 | Kutnyak |
| 5,331,534 A | 7/1994 | Suzuki et al. |
| 5,336,979 A | 8/1994 | Watson et al. |
| 5,408,222 A | 4/1995 | Yaffe et al. |
| 5,430,356 A | 7/1995 | Ference et al. |
| 5,459,478 A | 10/1995 | Bolger et al. |
| 5,463,286 A | 10/1995 | D'Aleo et al. |
| 5,469,000 A | 11/1995 | Geysen |
| 5,477,111 A | 12/1995 | Steely et al. |
| 5,493,183 A | 2/1996 | Kimball |
| RE35,220 E | 4/1996 | Johnson |
| 5,511,943 A | 4/1996 | Chang |
| 5,530,322 A | 6/1996 | Ference et al. |
| 5,621,283 A | 4/1997 | Watson et al. |
| 5,629,587 A | 5/1997 | Gray et al. |
| 5,633,629 A | 5/1997 | Hochstein |
| 5,644,291 A | 7/1997 | Jozwik |
| 5,646,490 A | 7/1997 | Carson et al. |
| 5,649,242 A | 7/1997 | O'Brien et al. |
| 5,697,695 A | 12/1997 | Lin et al. |
| 5,731,664 A | 3/1998 | Posa |
| 5,749,646 A | 5/1998 | Brittell |
| 5,753,983 A | 5/1998 | Dickie et al. |
| 5,790,019 A | 8/1998 | Edwin |
| 5,798,620 A | 8/1998 | Wacyk et al. |
| 5,808,417 A | 9/1998 | Ference et al. |
| 5,821,700 A | 10/1998 | Malvaso |
| 5,825,136 A | 10/1998 | Rudolph |
| 5,841,246 A | 11/1998 | Manders |
| 5,842,771 A | 12/1998 | Thrasher et al. |
| 5,893,626 A | 4/1999 | Poling |
| 5,914,569 A | 6/1999 | Bildgen |
| 5,924,784 A | 7/1999 | Chliwnyj et al. |
| 5,949,197 A | 9/1999 | Kastner |
| 5,969,479 A | 10/1999 | Wong |
| 5,984,513 A | 11/1999 | Baldwin |
| 5,990,635 A | 11/1999 | Ference et al. |
| 5,994,791 A | 11/1999 | Rayner |
| 6,002,216 A | 12/1999 | Mateescu |
| 6,016,038 A | 1/2000 | Mueller et al. |
| 6,057,651 A | 5/2000 | Usami |
| 6,081,191 A | 6/2000 | Green et al. |
| RE36,790 E | 7/2000 | Jincks et al. |
| 6,095,661 A | 8/2000 | Lebens et al. |
| 6,100,791 A | 8/2000 | Bader et al. |
| 6,126,303 A | 10/2000 | Gross |
| 6,140,987 A | 10/2000 | Stein et al. |
| 6,150,774 A | 11/2000 | Mueller et al. |
| 6,152,577 A | 11/2000 | Rizkin et al. |
| 6,166,496 A | 12/2000 | Lys et al. |
| 6,169,377 B1 | 1/2001 | Bryde et al. |
| 6,175,354 B1 | 1/2001 | Blissett et al. |
| 6,184,628 B1 | 2/2001 | Ruthenberg |
| 6,196,471 B1 | 3/2001 | Ruthenberg |
| 6,211,626 B1 | 4/2001 | Lys et al. |
| 6,213,623 B1 | 4/2001 | Campman |
| 6,217,188 B1 | 4/2001 | Wainwright et al. |
| 6,220,718 B1 | 4/2001 | Burgess |
| 6,222,172 B1 | 4/2001 | Fossum et al. |
| 6,227,679 B1 | 5/2001 | Zhang et al. |
| 6,241,362 B1 | 6/2001 | Morrison |
| 6,249,089 B1 | 6/2001 | Bruwer |
| 6,254,262 B1 | 7/2001 | Crunk et al. |
| 6,285,140 B1 | 9/2001 | Ruxton |
| 6,292,901 B1 | 9/2001 | Lys et al. |
| 6,305,818 B1 | 10/2001 | Lebens et al. |
| 6,340,868 B1 | 1/2002 | Lys et al. |
| 6,357,889 B1 | 3/2002 | Duggal et al. |
| 6,379,025 B1 | 4/2002 | Mateescu et al. |
| 6,402,339 B1 | 6/2002 | Mukogawa et al. |
| 6,435,691 B1 | 8/2002 | Macey et al. |
| 6,441,558 B1 | 8/2002 | Muthu et al. |
| 6,452,340 B1 | 9/2002 | Morrissey, Jr. et al. |
| 6,459,919 B1 | 10/2002 | Lys et al. |
| 6,461,008 B1 | 10/2002 | Pederson |
| 6,469,455 B1 | 10/2002 | Inoue |
| 6,483,439 B1 | 11/2002 | Vukosic |
| 6,528,954 B1 | 3/2003 | Lys et al. |
| RE38,069 E | 4/2003 | Posa |

(56) References Cited

U.S. PATENT DOCUMENTS

| | | |
|---|---|---|
| 6,554,454 B1 | 4/2003 | Kitano |
| 6,577,072 B2 | 6/2003 | Saito et al. |
| 6,580,228 B1 | 6/2003 | Chen et al. |
| 6,585,391 B1 | 7/2003 | Koch et al. |
| 6,585,399 B2 | 7/2003 | Kreutzer et al. |
| 6,616,291 B1 | 9/2003 | Love |
| 6,618,031 B1 | 9/2003 | Bohn, Jr. et al. |
| 6,622,053 B1 | 9/2003 | Hewlett et al. |
| 6,672,738 B1 | 1/2004 | Lewis et al. |
| 6,700,333 B1 | 3/2004 | Hirshi et al. |
| 6,720,745 B2 | 4/2004 | Lys et al. |
| 6,722,771 B1 | 4/2004 | Stephens |
| 6,744,223 B2 | 6/2004 | Laflamme et al. |
| 6,758,573 B1 | 7/2004 | Thomas et al. |
| 6,788,011 B2 | 9/2004 | Mueller et al. |
| 6,801,003 B2 | 10/2004 | Schanberger et al. |
| 6,806,659 B1 | 10/2004 | Mueller et al. |
| 6,811,286 B2 | 11/2004 | Mateescu et al. |
| 6,827,464 B2 | 12/2004 | Koren et al. |
| 6,867,757 B1 | 3/2005 | Nakamura |
| 6,900,742 B2 | 5/2005 | Chesney, II |
| 6,918,692 B2 | 7/2005 | Yang |
| 6,949,894 B1 | 9/2005 | Sullivan et al. |
| 6,967,448 B2 | 11/2005 | Morgan et al. |
| 6,984,900 B1 | 1/2006 | Bruwer |
| 7,014,336 B1 | 3/2006 | Ducharme et al. |
| 7,030,565 B2 | 4/2006 | Hollaway |
| 7,038,398 B1 | 5/2006 | Lys et al. |
| 7,064,498 B2 | 6/2006 | Dowling et al. |
| 7,113,541 B1 | 9/2006 | Lys et al. |
| 7,128,440 B2 | 10/2006 | Mateescu et al. |
| 7,139,617 B1 | 11/2006 | Morgan et al. |
| 7,186,003 B2 | 3/2007 | Dowling et al. |
| 7,352,339 B2 | 4/2008 | Morgan et al. |
| 7,358,961 B2 | 4/2008 | Zwanenburg |
| 7,427,840 B2 | 9/2008 | Morgan et al. |
| 7,449,847 B2 | 11/2008 | Schanberger et al. |
| 7,468,677 B2 | 12/2008 | Pederson et al. |
| 7,550,935 B2 | 6/2009 | Lys et al. |
| 7,726,869 B2 | 6/2010 | Chien |
| 7,740,371 B1 | 6/2010 | Lebens et al. |
| 7,756,556 B2 | 7/2010 | Patel et al. |
| 8,736,193 B2 | 5/2014 | Gallo |
| 8,818,530 B2 | 8/2014 | Netzel, Sr. et al. |
| 9,435,691 B2 | 9/2016 | Nakamura et al. |
| 9,907,137 B1 | 2/2018 | Lebens et al. |
| 10,057,964 B2 | 8/2018 | Raposo et al. |
| 10,588,200 B2 * | 3/2020 | Raposo ................ G06F 3/038 |
| 2002/0135476 A1 | 9/2002 | McKinney et al. |
| 2002/0149941 A1 | 10/2002 | Mateescu et al. |
| 2003/0076281 A1 | 4/2003 | Morgan et al. |
| 2003/0222782 A1 | 12/2003 | Gaudreau |
| 2004/0017158 A1 | 1/2004 | Ang et al. |
| 2005/0088119 A1 | 4/2005 | Potucek et al. |
| 2005/0174473 A1 | 8/2005 | Morgan et al. |
| 2005/0204463 A1 | 9/2005 | Ryan |
| 2006/0065510 A1 | 3/2006 | Kiko et al. |
| 2006/0176693 A1 | 8/2006 | Walter et al. |
| 2007/0216318 A1 | 9/2007 | Altonen et al. |
| 2008/0106422 A1 | 5/2008 | Sparks et al. |
| 2008/0144238 A1 | 6/2008 | Cline et al. |
| 2008/0165124 A1 | 7/2008 | Kim |
| 2008/0197788 A1 | 8/2008 | Conover et al. |
| 2008/0297068 A1 | 12/2008 | Koren et al. |
| 2009/0204239 A1 | 8/2009 | Netzel, Sr. et al. |
| 2009/0206769 A1 | 8/2009 | Biery et al. |
| 2011/0232687 A1* | 9/2011 | Stein ................ A47L 9/2842 134/21 |
| 2012/0106149 A1 | 5/2012 | Boa |
| 2013/0293112 A1* | 11/2013 | Reed ................ H05B 45/20 315/297 |
| 2013/0326595 A1 | 12/2013 | Myers et al. |
| 2014/0145644 A1* | 5/2014 | Netzel, Sr. ............ H05B 45/20 315/297 |
| 2014/0210373 A1* | 7/2014 | Baret ................ H05B 45/20 315/294 |
| 2014/0265842 A1 | 9/2014 | Potucek et al. |
| 2014/0265865 A1* | 9/2014 | Hickok ................ H05B 47/155 315/132 |
| 2014/0268678 A1 | 9/2014 | Potucek et al. |
| 2015/0102731 A1 | 4/2015 | Altamura et al. |
| 2016/0143115 A1 | 5/2016 | Zhang |
| 2016/0286633 A1 | 9/2016 | Juslen |
| 2016/0360597 A1 | 12/2016 | Greene |

FOREIGN PATENT DOCUMENTS

| | | |
|---|---|---|
| CN | 2634785 Y | 8/2004 |
| CN | 1829404 A | 9/2006 |
| GB | 2 236 025 A | 3/1991 |
| GB | 2 239 306 A | 6/1991 |
| KR | 10-2007-0062669 A | 6/2007 |
| WO | 97/11448 A1 | 3/1997 |
| WO | 99/10867 A1 | 3/1999 |
| WO | 02/061330 A2 | 8/2002 |
| WO | 2004/023034 A1 | 3/2004 |
| WO | 2004/049289 A1 | 6/2004 |
| WO | 2004/100624 A2 | 11/2004 |
| WO | 2006/093889 A2 | 9/2006 |
| WO | 2008/067402 A2 | 6/2008 |

OTHER PUBLICATIONS

Pentair, "IntelliBrite 5G Color LED Pool Light—Installation and User's Guide", P/N 619827, Rev G, Apr. 2015. (24 pages).

Pentair, "IntelliTouch Owner's Manual—Set-Up and Programming", P/N 520102, Rev. C, May 2003. (60 pages).

Pentair, "IntelliTouch Pool and Spa Control System—User's Guide", P/N 520102, Rev. J, 2011. (126 pages).

Freescale Semiconductor, "Implementing a Lamp Dimmer with an HC908Q Family MCU", Application Note AN2839, Rev. 0, Sep. 2004. (24 pages).

Office Action (Restriction Requirement) dated Jan. 31, 2017, issued in connection with U.S. Appl. No. 15/050,207 (5 pages).

Office Action (Ex Parte Quayle) dated Nov. 2, 2017, issued in connection with U.S. Appl. No. 15/050,207 (7 pages).

Notice of Allowance dated Jan. 29, 2018, issued in connection with U.S. Appl. No. 15/050,207 (10 pages).

Notice of Allowance dated Jun. 22, 2018, issued in connection with U.S. Appl. No. 15/050,207 (10 pages).

Office Action dated Mar. 4, 2019, issued in connection with U.S. Appl. No. 16/106,801 (12 pages).

Interview Summary dated Aug. 30, 2019, issued in connection with U.S. Appl. No. 16/106,801 (2 pages).

Notice of Allowance dated Sep. 10, 2019, issued in connection with U.S. Appl. No. 16/106,801 (9 pages).

* cited by examiner

FIG. 3A (Cont.)

LIGHTING SYSTEM FOR AN ENVIRONMENT AND A CONTROL MODULE FOR USE THEREIN

CROSS-REFERENCE TO RELATED APPLICATIONS

This application is a continuation application of U.S. patent application Ser. No. 16/106,801 filed on Aug. 21, 2018, which is a continuation application of U.S. patent application Ser. No. 15/050,207 filed on Feb. 22, 2016, which is a continuation application of U.S. patent application Ser. No. 14/790,956 filed on Jul. 2, 2015, the entire disclosures of all of which are expressly incorporated by reference herein.

BACKGROUND

Technical Field

The present disclosure relates to lighting systems. More particularly, the present disclosure relates to a lighting system including a line control module that controls operation of light modules in the lighting system, and more particularly, to a lighting system including a line control module for controlling operation of the light modules based on interruption of power to the light modules.

Related Art

Lighting systems for residential and commercial aquatic environments (e.g., pool, spa, water parks, etc.) are becoming increasingly sophisticated. In some instances, lights in a lighting system can output different colors that can be used to generate a variety of "light shows," which, as used herein, refers to the ability of the lights to output color(s) either statically or dynamically over time. As an example, a light show may include outputting a color from a light, where the color of the light remains the same until the user changes the color of the light. As another example, a light show may include repeatedly outputting a sequence of colors from a light over time.

One approach to controlling which light show is output by the lights includes connecting the lights to a manual switch, such as a conventional wall mounted light switch. To control which light show is output by the lights, the user manually cycles the switch between its on and off position. For example, each time the user cycles the power to the lights by turning the light switch off and then on, the lights can increment to the next light show that can be output by the lights. As a result, a user may have to cycle the power several times to select a desired light show to be output by the lights. The use of a manual switch can also limit an operation of a lighting system that is configured to output light shows. As one example, it may not be possible or practical to implement dimming functions, to change a rate at which the lights cycle through colors in a selected light show, and/or set a timer or schedule an operation of the lights using a manual switch.

Another approach to controlling which light show is output by lights in a light system includes incorporating networking capabilities into the lights so that the lights can be controlled by a central controller via a data network, where each light includes a unique identifier/address and the central control issue packets of data over the data network to the lights using the unique identifiers/addresses of the lights. While this approach provides improved flexibility and sophistication over the manual switch approach, it can be cumbersome and time consuming to install and may add unnecessary complexity to a lighting system.

SUMMARY

The present disclosure relates to a line control module and lighting systems that utilize the line control module to control operation of the light modules in the lighting system. In one embodiment, a lighting system is disclosed that includes a light module and a line control module. The light module is configured to output light in different colors according to light show programs. The line control module is operatively coupled to the light module and controls transmission of line voltage to the light module to selectively power the light module. The line control module sends commands to the light module to control an operation of the light module by interrupting the transmission of the line voltage to the light module for a specified time period in response to user inputs received by the line control module.

In another embodiment, a line control module for a light system is provided, including one or more light modules configured to output light in different colors. The line control module includes one or more switches, a non-transitory computer-readable medium, and a processing device. The one or more switches are configured to selectively connect a line voltage at an input of the line control module to an output of the line control module. The non-transitory computer-readable memory stores firmware. The processing device is operatively coupled to the one or more switches and the non-transitory computer-readable medium, and is programmed to execute the firmware to control the one or more switches to disconnect the line voltage from the output for a first duration of time and to reconnect the line voltage to the output after the first duration of time. The first duration of time for which the power is disconnected corresponds to a command for controlling an operation of one or more light modules operatively coupled to the output of line control module.

In another embodiment, a method of controlling an operation of light modules in a lighting system using a line control module configured to operatively couple a mains power supply to the light modules and to electrically isolate the mains power supply from the light modules is disclosed. The method includes initiating an operation for adjusting one or more settings of the light modules in response to actuation of a mode selection switch, energizing one or more indicator light emitting diodes of the line control module to indicate a last setting of the light modules; adjusting a quantity of the indicator light emitting diodes that are energized in response to rotation of a shaft of a rotary encoder of the line control module to indicate a new setting of the light modules; and toggling power to the light modules by the line control module to instruct the light modules to adjust an output based on the new setting.

Any combination and permutation of embodiments is envisioned. Other embodiments, objects, and features will become apparent from the following detailed description considered in conjunction with the accompanying drawings. It is to be understood, however, that the drawings are designed as an illustration only and not as a definition of the limits of the present disclosure.

DETAILED DESCRIPTION

Exemplary embodiments of the present disclosure are directed to a lighting system and components thereof including, for example, a line control module and light modules. The line control module can control an operation of light modules in the lighting system. In exemplary embodiments, the line control module can control an operation of light modules by cycling the power to the light modules (e.g., disconnecting and connecting the light modules to a power source) according to one or more sets of commands. The sets of commands can determine how many times the line control module toggles the power to light modules and/or how long power to the light modules is interrupted (e.g., disconnected from the power source) by the line control module each time the power is toggled. The one or more sets of commands used by the line control module can be determined based on a version of firmware being implemented by the light modules and/or a function of the line control module itself.

In accordance with exemplary embodiments of the present disclosure, the line control module can include a user interface (e.g., one or more switches, a display device with a touch screen, a track ball, a rotary encoder, and/or any other suitable user interface) that allows a user to interact with the line control module to control an operation of the line control module and/or to control an operation of light modules operatively coupled to the line control module. For example, in exemplary embodiments, the user interface can allow the user to change/select a light show to be output by light modules operatively coupled to the lighting system, change/adjust an intensity (brightness) of the light being output by the light modules, change/adjust a rate at which the light modules cycle through the colors of a light show, and/or can allow the user to set a timer and/or schedule an operation of the light modules so that the light modules output light according to the timer or the schedule of operation.

Figure 1:
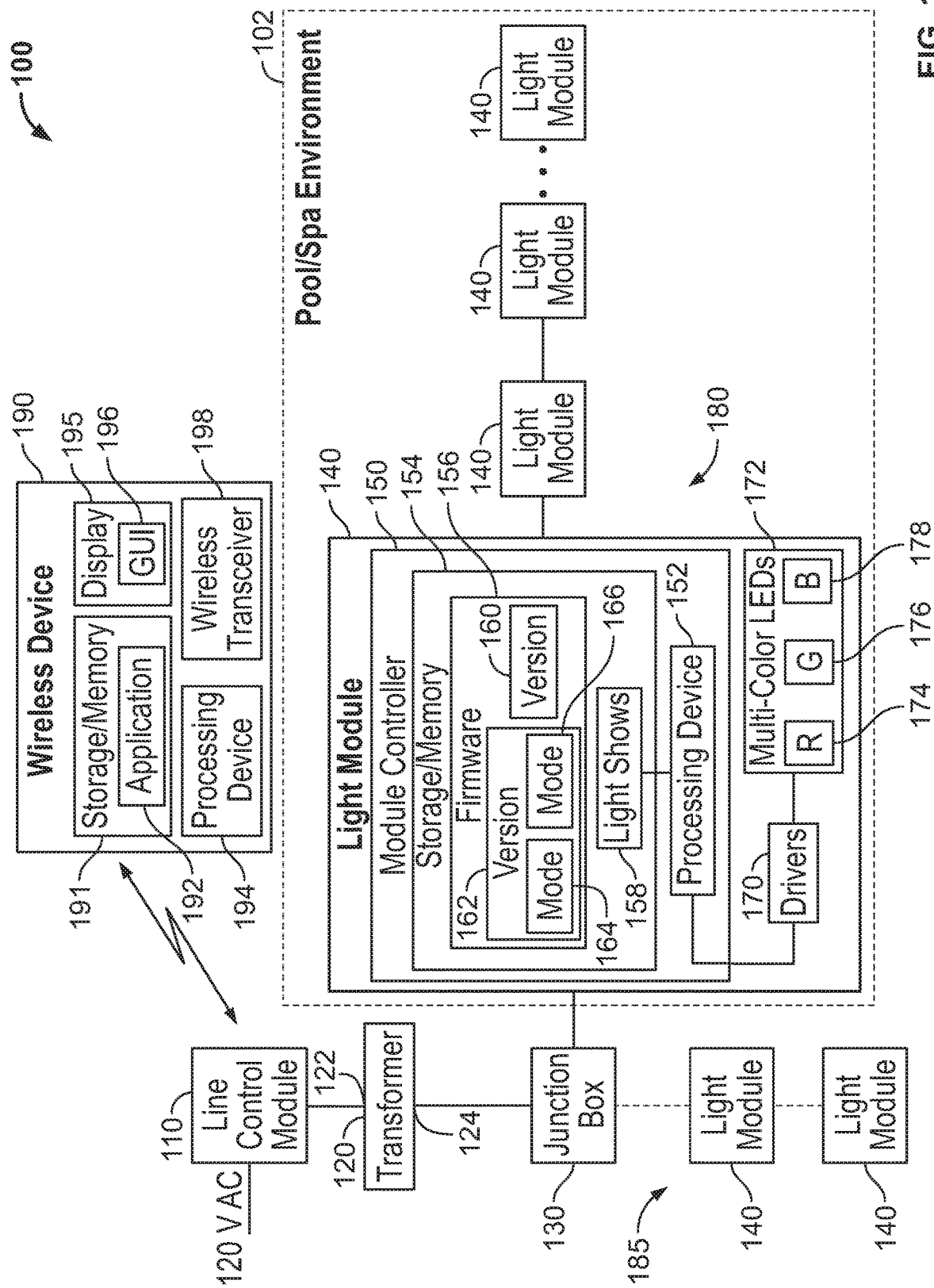
FIG. 1 is a block diagram of an exemplary lighting system in accordance with exemplary embodiments of the present disclosure.

FIG. 1 is a block diagram of an exemplary lighting system 100 in accordance with exemplary embodiments of the present disclosure. The lighting system 100 can include a circuit formed by a line control module 110, a transformer 120, a junction 130, and light modules 140. In some embodiments, at least a portion of the lighting system 100 can be implemented in a pool, spa, and/or other aquatic environment 102, such that at least some of the light modules 140 can be underwater lights and/or above water lights disposed in and/or on the walls or other features of a pool/spa environment 102. In some embodiments, at least a portion of the lighting system 100 can be implemented outside of the pool/spa environment 102. In exemplary embodiments, the lighting system 100 can be configured to provide one or more colors of light. For example, as described herein, the light modules 140 can be individually and/or collectively controlled by the line control module 110 to statically output a color (e.g., red, green, blue, yellow, purple, orange, etc.) and/or can be controlled by the line control module 110 to dynamically output colors over time according to a programmed color sequence (e.g., red to blue to green).

In exemplary embodiments, the line control module 110 can be electrically coupled to a line voltage (e.g., approximately 100-240 VAC operating at approximately 50-60 hertz), which can be used to power the line control module 110 and the light modules 140. For example, the line control module 110 can be a wall-mountable device that is operatively coupled to a mains power system (e.g., a utility power grid) via a circuit breaker. In the embodiment shown in FIG. 1, the line control module 110 can be connected to a line (or "hot") wire and a neutral wire of the mains power system. The line control module 110 can be configured (e.g., via a user interface) to selectively open and close/complete the circuit of the lighting system 100 to control the power to the lighting system 100 (e.g., by disconnecting the line voltage and connecting the line voltage, respectively). In exemplary embodiments, the line control module 110 can be configured to open and close the circuit to create a sequence of power interruptions or timed power interruptions, which can be used by the light modules 140 to control an operation of the light modules 140 as described herein. While exemplary embodiments may be described relative to certain line voltage, frequency, phase, and wiring schemes, those skilled in the art will recognize that the voltage, phase, frequency, and wiring schemes vary by country and/or geographic region and that exemplary embodiments of the present disclosure are not limited to line voltages, frequencies, and wiring schemes of any specific country and/or geographic region.

Exemplary embodiments of the line control module 110 can be implemented by a pool/spa controller that can control an operation of the lighting system 100 as well as an operation of components of a pool/spa (e.g., chlorinator, heater, pump, etc.), and/or the line control module 110 can be implemented as a stand-alone controller that is dedicated to controlling an operation of the lighting system 100. The line control module 110 can have one or more power interruption operating modes for controlling light modules. The power interruption operating mode used by the line control module 110 can be selected or specified based on a version of firmware being utilized by the light modules 140 to operate the light modules 140. As one example, the line control module 110 can operate according to a first operating mode that generates a first set of control signals to control an operation of the light modules 140. The first set of control signals can cycle the power to the light modules such that the operation of the light modules is determined by the number of times the power is cycled. As another example, the line control module 110 can operate according to a second operating mode that generates a second set of control signals to control an operation of the light module. The second set of control signals can cycle the power to the light modules such that the operation of the light module is determined by a time period for which the power to the light modules is interrupted.

The transformer 120 can be electrically coupled to the line control module to receive the line voltage from the line control module 110 when the line control module 110 closes/completes the electrical circuit of the lighting system 100. The transformer 120 can be a low-voltage (or step down) transformer that can receive the line voltage via the line control module 110 on a primary (input) side 122 of the transformer 120 and can output a reduced voltage to the light modules 140 on a secondary (output) side 124 of the transformer 120. As a non-limiting example, when a line voltage of approximately 120 VAC received by the primary side 122 of the transformer 120 can be used to generate an output voltage on the secondary side 124 of the transformer 120 of approximately 12 to approximately 24 VAC. As one non-limiting example, the low-voltage transformers can be the LTBUY11300 wall mount transformer from Hayward Industries.

The junction box 130 provides a node in the lighting system 100 at which wires can be joined and allows for parallel circuit arrangements of lights and/or other electrical components. For example, as shown in FIG. 1, the lighting system 100 can include a first leg 180 that includes the light modules 140 and a second leg 185 that includes additional light modules 140. While the junction box 130 and the transformer 120 have been illustrated as separate components in FIG. 1, those skilled in the art will recognize that the junction box 130 and transformer 120 can be implemented as a single component in the lighting system 100. Furthermore, for embodiments in which the junction box 130 and the transformer 120 are separate components, those skilled in the art will recognize that the transformer 120 can be electrically connected between the line control module 110 and the junction box 130 or the junction box 120 can be electrically connected between the line control module 110 and the transformer 130. In some embodiments, the transformer 120 can be electrically coupled to the light modules 140 without passing through the junction box 130.

In exemplary embodiments, the light modules 140 receive the low-voltage output from the transformer 120 to power the light modules. Each of light modules 140 can include a module controller 150, one or more light emitting diode (LED) drivers 170, and one or more LEDs 172 configured to output one or more colors (e.g., a red LED 174, a green LED 176, a blue LED 178). The module controller 150 can be formed by a processing device 152 and a non-transitory computer-readable medium 154 (e.g., storage/memory), such as Flash memory. Firmware 156 and light show programs 158 can be stored in the medium 154. The light show programs can define different output settings for the light modules 140. For example, some light show programs can be selected to set the light output of the light modules 140 to static colors that do not change over time, and some light show programs can be selected to control the light output of the light modules to change colors as a function of time such that the light output of the light modules can change from one color to another.

In exemplary embodiments, the light modules 140 can include multiple versions of firmware 156. For example, as shown in FIG. 1, one or more of the light modules 140 can include a first version 160 of firmware 156 and a second version 162 of firmware 156. When the light modules 140 include the versions 160 and 162 of firmware 156, the light modules 140 can operate according to either of the versions 160 and 162 of firmware 156 by default and/or in response to one or more commands received from the line control module 110. In exemplary embodiments, the light modules 140 can switch between the first version 160 and second version 162, or vice versa, in response to one or more commands received from the light control module 110, which can be generated automatically by the light control module or can be generated in response to an interaction (direct or indirect) between the user and the light control module 110.

The first version 160 of the firmware 156 can be executed by the processing device 152 to process commands from the line control module 110 that are generated by power cycling, where a quantity of power interruptions corresponds to the command being received. When the first version 160 of the firmware 156 is being executed, the commands can be processed by the processing device 152 to enable outputting a particular light show upon receipt of the commands. Each power interruption can cause the light module to increment its output to the next light show according to an order of lights shows when the light module operates according to the first version 160 of the firmware 156. For example, Table 1 shows an exemplary order of light shows (color shows 1-17) that can be output by one or more of the light modules 140. When the light modules 140 are operating according to the first version 160 of the firmware, to change the output of the light modules 140 from the light show, "color show 1," to the light show, "color show 4," the light modules 140 step through each of the light show programs between the color show 1 and color show 4 (e.g., color shows 2 and 3). Using the first version 160 of the firmware 160, one power cycle (a disconnect then reconnect to power) corresponds to one step or increment in the order such that a transition from color show 1 to color show 4 would require the light module to receive three power cycles.

TABLE 1

Order of light shows for the first version of firmware.

| Order | Light Show |
|---|---|
| 1 | Color Show 1 |
| 2 | Color Show 2 |
| 3 | Color Show 3 |
| 4 | Color Show 4 |
| 5 | Color Show 5 |
| 6 | Color Show 6 |
| 7 | Color Show 7 |
| 8 | Color Show 8 |
| 9 | Color Show 9 |
| 10 | Color Show 10 |
| 11 | Color Show 11 |
| 12 | Color Show 12 |
| 13 | Color Show 13 |
| 14 | Color Show 14 |
| 15 | Color Show 15 |
| 16 | Color Show 16 |
| 17 | Color Show 17 |

The second version 162 of the firmware 156 can be executed by the processing device 152 to process commands from the line control module 110 that include timed power cycling, where a duration of the power off (e.g., power disconnect) time corresponds to the command being received. When the second version 162 of the firmware 156 is being executed, the commands can be processed by the processing device 152 to enable outputting a particular light show upon receipt of the commands, setting an intensity of the light output by the LEDs 172, setting a rate (if applicable) with which a light show transitions from one color to the next color (e.g., transition from one color to the next color every 45 seconds), and/or can be processed by the processing device 152 to control one or more other functions or parameters of the light module. In some embodiments, some of the light modules 140 can include only the first version 160 of the firmware 156, some can include only the second version 162 of firmware 156, and/or some light modules 140 can include both versions 160 and 162 of the firmware 156.

In exemplary embodiments, the first and/or second versions 160 and 162 can include one or more command processing modes. As a non-limiting example, the second version 162 of the firmware 156 can include a first command processing mode 164 and a second command processing mode 166. The first command processing mode 164 can be implemented to process commands that are received asynchronously relative to the AC power cycle, and the second command processing mode can be implemented to process commands that are received synchronously relative to the AC power cycle (e.g., commands are synchronized to zero crossings of the AC power cycle and/or peak AC voltage of the power cycle). The first command processing mode 164 can be configured to use approximately 33 millisecond power-off pulse increments (in some embodiments approximately 33.33 milliseconds) for commands (e.g., each command corresponds to power off time having a multiple of approximately 33 milliseconds), and the second command processing mode 166 can use approximately 17 millisecond power-off pulse increments (in some embodiments approximately 16.67 milliseconds) for commands (e.g., each command corresponds to power off time having a multiple of approximately 17 milliseconds). In some embodiments, the ability to use the command processing modes 164 and 166 can depend, at least partially, upon an operation of the line control module 110 operatively coupled to the light modules 140.

Table 2 shows an exemplary set of commands that can be generated by the line control module 110 and received by the light modules 140 operating according to the second version 162 of the firmware 156. As shown in the "Off Pulse Width (slow mode) ms" column of Table 2, when the line control module 110 is set to transmit commands asynchronously with respect the AC voltage cycle, and the light module 140 operates according to the first command processing mode 164, the commands are determined by a duration of the power interruption, where the duration of the power interruption can be changed by increments of approximately 33 milliseconds starting at approximately 50 milliseconds to generate different commands. For example, a duration of the power interruption that is approximately equal to 50 milliseconds corresponds to a command to set the output of light module 140 to its maximum intensity/brightness, and a duration of the power interruption that is approximately equal to 83 milliseconds corresponds to a command to set the brightness of the output of the light module 140 to about 80%. As shown in the "Off Pulse Width (fast mode) ms" column of Table 2, when the line control module 110 is set to transmit commands based on a synchronization with the AC voltage cycle and the light module 140 operates according to the second command processing mode 166, the commands are determined by a duration of the power interruption, where the duration of the power interruption can be changed by increments of approximately 17 milliseconds starting at approximately 33 milliseconds to generate different commands. For example, a duration of the power interruption that is approximately equal to 33 milliseconds corresponds to a command to set the output of light module 140 to its maximum brightness, and a duration of the power interruption that is approximately equal to 50 milliseconds corresponds to a command to set the brightness of the output of the light module 140 to about 80%. The "No. of 60 Hz Ac Cycles for fast mode" column in Table 2, indicates how many 60 Hz AC cycles the commands correspond to when the line control module 110 is set to transmit commands based on a synchronization with the AC voltage and the light module 140 operates according to the second command processing mode 166.

TABLE 2

Timed commands for the second version of firmware.

| Index | Off Pulse Width (slow mode) mS | Off Pulse Width (fast mode) mS *60 Hz AC* | No. of 60 Hz AC Cycles for fast mode | Commands |
|---|---|---|---|---|
| 1 | 50 | 33 | 2 | Set Brightness to 100% |
| 2 | 83 | 50 | 3 | Set Brightness to 80% |
| 3 | 117 | 67 | 4 | Set Brightness to 60% |
| 4 | 150 | 83 | 5 | Set Brightness to 40% |
| 5 | 183 | 100 | 6 | Set Brightness to 20% |
| 6 | 217 | 117 | 7 | Set Speed to x$\frac{1}{16}$ |
| 7 | 250 | 133 | 8 | Set Speed to x$\frac{1}{8}$ |
| 8 | 283 | 150 | 9 | Set Speed to x$\frac{1}{4}$ |
| 9 | 317 | 167 | 10 | Set Speed to x$\frac{1}{2}$ |
| 10 | 350 | 183 | 11 | Set Speed to x1 |
| 11 | 383 | 200 | 12 | Set Speed to x2 |
| 12 | 417 | 217 | 13 | Set Speed to x4 |
| 13 | 450 | 233 | 14 | Set Speed to x8 |
| 14 | 483 | 250 | 15 | Set Speed to x16 |
| 15 | 517 | 267 | 16 | Color Show 1 |
| 16 | 550 | 283 | 17 | Color Show 2 |
| 17 | 583 | 300 | 18 | Color Show 3 |

TABLE 2-continued

Timed commands for the second version of firmware.

| Index | Off Pulse Width (slow mode) mS | Off Pulse Width (fast mode) mS *60 Hz AC* | No. of 60 Hz AC Cycles for fast mode | Commands |
|---|---|---|---|---|
| 18 | 617 | 317 | 19 | Color Show 4 |
| 19 | 650 | 333 | 20 | Color Show 5 |
| 20 | 683 | 350 | 21 | Color Show 6 |
| 21 | 717 | 367 | 22 | Color Show 7 |
| 22 | 750 | 383 | 23 | Color Show 8 |
| 23 | 783 | 400 | 24 | Color Show 9 |
| 24 | 817 | 417 | 25 | Color Show 10 |
| 25 | 850 | 433 | 26 | Color Show 11 |
| 26 | 883 | 450 | 27 | Color Show 12 |
| 27 | 917 | 467 | 28 | Color Show 13 |
| 28 | 950 | 483 | 29 | Color Show 14 |
| 29 | 983 | 500 | 30 | Color Show 15 |
| 30 | 1017 | 517 | 31 | Color Show 16 |
| 31 | 1050 | 533 | 32 | Color Show 17 |

The processing device 152 can be programmed to execute the firmware 156 to retrieve and implement the light show programs 158 according to commands received from the line control module 110 in the form of power interruptions as described herein. The processing device 152 can output one or more drive signals to the one or more LED drivers 170, which can operate in response to the drive signals to control an output of the one or more LEDs 172 to implement the selected light show program. In some embodiments, the drive signals output by the processing device 152 can be pulse width modulated (PWM) signals. In addition to controlling the one or more LEDs 172 based on a selected light show program, the processing device 152 can be programmed to execute the firmware 156 to control an intensity of the light output by the LEDs 172 to control the brightness of the light output by the LEDs (e.g., in response to commands from the line control module 110.

In some embodiments, a wireless device 190, such as a mobile phone (e.g., a smart phone), a tablet computer, a laptop, and/or any other suitable device capable of wireless communication, can be configured to communicate with the line control module 110 to control an operation of the lighting system 100. For example, the wireless device 190 can include an application 192 (stored in a non-transitory computer-readable medium 191) that can be executed by a processing device 194 of the wireless device 190. Execution of the application 192 by the processing device 194 can generate and render graphical user interfaces 196 on a display 195 of the wireless device 190, which allows a user of the wireless device 190 to interact with the wireless device 190 to transmit commands and/or data to the line control module 110 via an RF wireless transceiver 198. The line control module 110 can process the commands and/or data received from the wireless device 190 to output commands to the light modules 140 (e.g., in the form of sequences of power interruptions) to control an operation of the light modules 140. In some embodiments, the graphical user interfaces 196 can be rendered on the display 195 to simulate a user interface (e.g., physical or virtual) of the line control module 110 described herein and/or can implement additional, fewer, and/or different features and/or function than the user interface of the line control module 110 described herein. The wireless transceiver 198 can be operatively coupled to the processing device 194 to allow the wireless device 190 to wirelessly communicate with the line control module 110 to transmit and receive commands and/or data.

The graphical user interfaces 196 can include data output areas to display information to the users as well as data entry areas to receive information from the users. For example, data output areas of the graphical user interfaces 196 can output information associated with an operation of the line control module and/or light modules to the users via the data outputs and the data entry areas of the graphical user interfaces 196 can receive, for example, information from a user associated with an operation of the line control module and/or the light modules. Some examples of data output areas can include, but are not limited to text, graphics (e.g., graphs, maps (geographic or otherwise), images, and the like), and/or any other suitable data output areas. Some examples of data entry fields can include, but are not limited to text boxes, check boxes, buttons, dropdown menus, lists with selectable elements, and/or any other suitable data entry fields.

The graphical user interfaces 196 can allow a user to select light shows to be output by light modules, can adjust an intensity of the light output by the light modules and can adjust a rate at which the light modules cycle through a light show. The graphical user interfaces 196 can allow the user to specify or set a timer or to schedule an operation of the light modules based on a calendar so that the user can specify days and times during which the light modules operate as well as which light shows are output by the light modules during the scheduled times of operation can be specified or set.

In an exemplary operation, the line control module 110 can receive input from a user (e.g., via a user interface of the line control module 110 and/or from the wireless device 195) selecting a light show to be output by the light modules 140. In response to the selection, the light control module can be configured to implement power interruptions to the light modules 140 (e.g., by disconnecting and connecting the line voltage) that corresponds to commands for controlling an operation of the light modules 140. The light modules 140 can detect the power interruptions, and the processing device 152 of the light module 140 can be programmed to execute the firmware to process the power interruptions to determine, for example, which of the light shows to retrieve from the computer readable medium 154, a brightness of the output of the light modules, a rate at which the color output by the light modules change, a version of firmware to be executed by the light modules 140 (e.g., for light modules that include multiple versions of firmware), and the like. When the light module receives a command for outputting a light show, the processing device 152 retrieves one of the light show programs 158 from storage that corresponds to the selected light show, and outputs drive signals to the LED driver(s) 170, which correspond to the selected light show. The LED driver(s) 170 can drive the LEDs 172 based on the drive signals to output the selected light show.

Figure 2A:
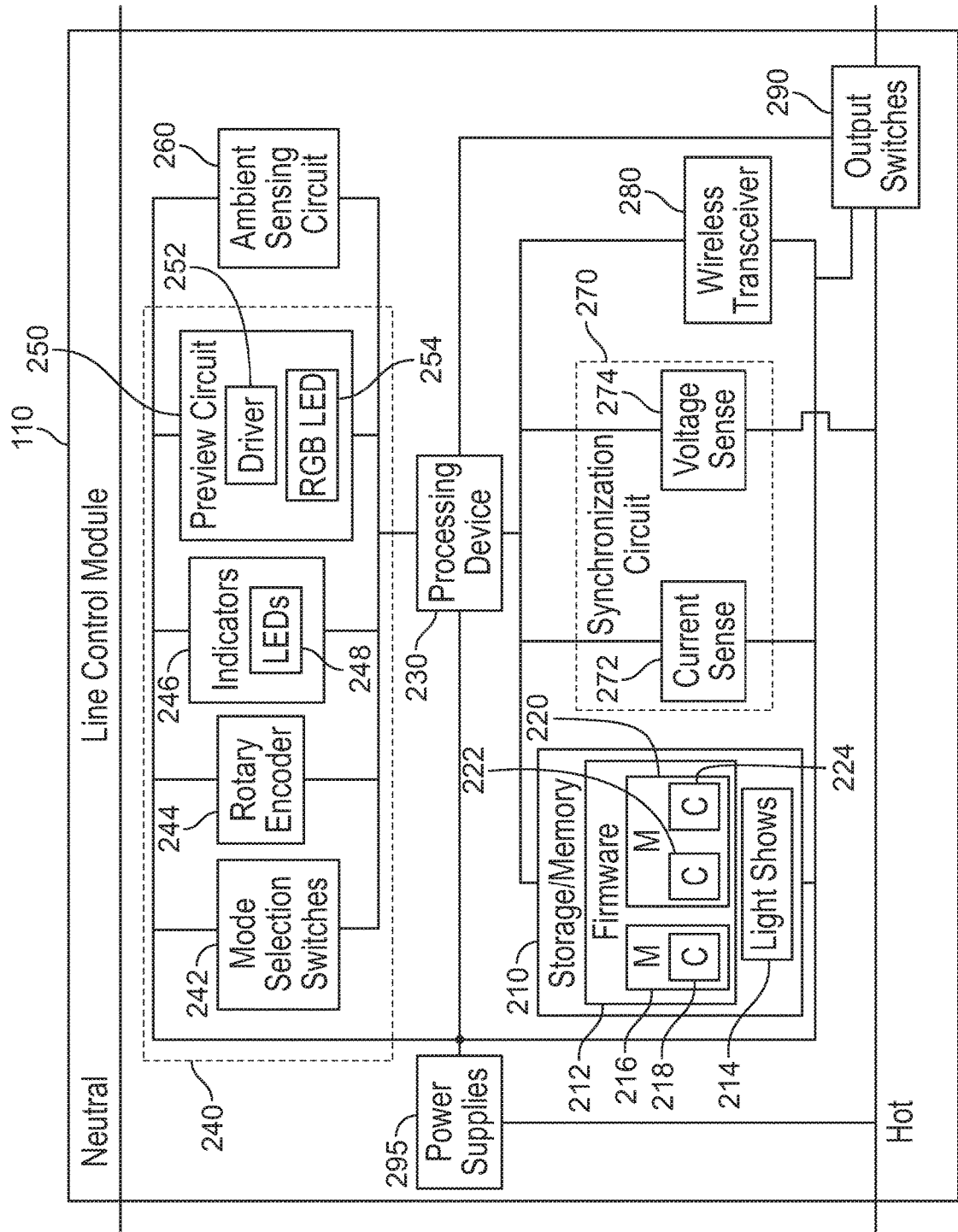
FIG. 2A is a block diagram of a line control module in accordance with exemplary embodiments of the present disclosure.

FIG. 2A is a block diagram of an exemplary embodiment of the line control module 110. As shown in FIG. 2A, the line control module 110 can include circuitry formed by a non-transitory computer-readable medium 210 (e.g., computer storage/memory), a processing device 230, a user interface 240 (including electrical, electromechanical, mechanical, and/or virtual components), an ambient sensing circuit 260, a synchronization circuit 270, a wireless transceiver 280, output switches 290, and one or more power supply circuitry 295. In some embodiments, the non-transitory computer-readable medium 210 and the processing device 230 can be stand-alone separately packaged components. In some embodiments, the non-transitory computer readable medium 210 and the processing device can be packaged or integrated together with or without additional circuitry to form a microcontroller. The power supply circuitry 295 can be electrically coupled to the circuitry within the line control module 110 to supply power to the circuitry based on the AC line voltage received by the line control module 110. In exemplary embodiments, some of the circuitry within the line control module 110 can have different operating voltages (e.g., 3.3 volts, 4.5 volts, etc.), and the power supply circuitry 295 can be configured to output DC voltages to the circuitry based on these operating voltages. As a non-limiting example, in some embodiments, the processing device 230 may have an operating voltage of approximately 3.3 volts, while portions of the user interface 240 may have an operating voltage of approximately 4.5 volts.

The non-transitory computer-readable medium 210 (e.g., computer storage and/or memory) can be implemented as, for example, Flash memory, and can store firmware 212 and light show programs 214. The firmware 212 can include executable instructions or code that can be executed by the processing device 230 to control an operation of the line control module 110. In exemplary embodiments, the firmware 212 can include different power interruption operation modes 216 and 220. The power interruption operating modes 216 and 220 can correspond to different versions of firmware (e.g., versions 160 and 162 in FIG. 1) included in the light modules of a lighting system within which the line control module 110 is implemented. The operating mode 216 can include a set of commands 218 that can be issued by the line control module 110 to control an operation of the light modules operating according to one version of firmware being implemented by the light modules, and the operating modes 220 can include sets of commands 222 and 224 that can be issued by the line control module 110 to control an operation of light modules according to another version of firmware being implemented by the light modules.

In exemplary embodiments, the power interruption operating mode 216 of firmware 212 can be compatible with the version 160 of firmware 156 (FIG. 1) to allow the processing device 230 of the line control module 110 to issue commands, from the set of commands 218, to light modules operating according to the version 160 of firmware 156 such that the light modules can understand and process the commands. For example, the commands in the set of commands 218 can control a quantity of power interruptions (e.g., power cycling) to the light modules to control which light show is output by the light modules. In some embodiments, different quantities of power interruptions can be associated with specific light shows that can be output by the light modules (e.g., one power interruption can cause the light module to output Color Show 1 and five power interruption can cause the light module to output Color Show 5). In some embodiments, the quantities of power interruptions can be used by the light modules to determine which light show to output based on the light show currently being output by the light modules such that the line control module can store the last programmed light show being output by the light modules (e.g., if Color Show 1 is being output and two power interruptions are received by the light modules, the light modules can output Color Show 3, but if Color Show 5 is being output by the light modules, then two power interruptions can cause the light modules to output Color Show 7).

In exemplary embodiments, the power interruption operating mode 220 of firmware 212 can be compatible with the version 162 of firmware 156 (FIG. 1) to allow the processing device 230 of the line control module 110 to issue commands, from the sets of commands 222 and/or 224, to light modules operating according to the version 162 of firmware 156 such that the light modules can understand and process the commands. For example, the commands in the sets of commands 222 and/or 224 can control a duration of a power interruption (e.g., power cycling) to the light modules to control which light show is output by the light modules; a brightness of the light output by the light modules; and a rate at which the light modules transition from one color to another (for light shows that repeatedly output a sequence of colors). In some embodiments, for each set of commands (e.g., sets 222 and 224), there can be a one-to-one correlation between a command and a duration of the power interruption, as described herein, for example, with reference to Table 2. In some embodiments, the set of commands 222 can be used to control the light modules when the light modules are operating according to the first command processing mode 164 (FIG. 1), and the set of commands 224 can be used to control the light modules when the light modules are operating according to the second command processing mode 166 (FIG. 1).

The light control module 110 can be programmatically configured to automatically switch between the power interruption operating modes 216 and 220 (and the sets of commands 222 and 224) based on the types of light modules operatively coupled to the line control module 110 and/or can allow a user to manually switch between the power interruption operating modes 216 and 220 (and the sets of commands 222 and 224) based on user inputs corresponding to the types of light modules operatively coupled to the line control module 110. As one non-limiting example, the processing device 230 of line control module 110 can execute the firmware 212 to allow the line control module 110 to detect which firmware a light module is using, and the processing device 230 can select the mode (e.g., mode 216 or 220) and set of commands (e.g., sets 218, 222, or 224) to utilize when generating power interruptions to control the light module. In some embodiments, the line control module can detect whether multiple versions of firmware reside in a light module and can control which version of the firmware is utilized by the light module by generating one or more power interruptions. As another non-limiting, the user can observe a function/operation of the light module to determine (or can otherwise determine) which firmware is being utilized by light modules and can interact with the line control module 110 to set the line control module 110 to a mode (and specify a set of commands) to be utilized when generating power interruptions to control the light module.

The light show programs 214 stored in the storage/memory 210 can correspond to the light show programs stored in the light show programs 168 stored in the storage/memory 154 of the light modules 140 (FIG. 1). When a user interacts with the line control module 110 (either directly or indirectly) to preview a light show before activating a light show to be output by the light modules, the processing device 230 of the line control module 110 can execute the firmware 212 to retrieve the light show program 214 from the storage/memory 210 that corresponds to the user's selected light show to be previewed, and to output a preview of the light show via the user interface 240 of the line control module 110. If the user chooses to activate the light show, the processing device 230 can issue one or more commands to instruct the light modules to output the selected light show (e.g., by issuing control signals to the output switches 290). After the light show is activated, the processing device 230 can execute the firmware 212 to reduce a brightness of (or cease outputting) the preview being output by the line control module 110.

The user interface 240 can include electrical, electromechanical, mechanical, and/or virtual components, and can allow a user to interact with the line control module 110 to control an operation of the lighting system within which the line control module 110 is implemented. In exemplary embodiments, the user interface 240 can include mode selection switches 242, a rotary encoder 244, indicators 246 in the form of LEDs 248, and a light show preview circuit 250. In some embodiments, at least a portion of the user interface 240 can be rendered on a display device having a touch screen interface. For example, rather than having physical components such as the mode selection switches 242, the rotary encoder 244, the indicators 246, and/or the light show preview circuit 250, the display device can render virtual components that can be controlled by the user via an interaction with the touch screen interface.

The mode selection switches 242 can include, for example, a light show selection switch, a brightness selection switch, a timer selection switch, and a light show rate switch. The light show selection switch can be activated by the user to cause the processing device 230 to execute a light show selection operation to allow the user to select a light show to be output by light modules operatively coupled to the line control module 110. The brightness selection switch can be activated by the user to cause the processing device to execute a brightness operation to allow the user to set and/or adjust a brightness/dimness of the light output by light modules operatively coupled to the line control module 110. The timer selection switch can be activated by the user to cause the processing device 230 to execute a timer operation to allow the user to initiate, set, and/or cancel a timer that controls when the light modules output light shows (e.g., a timer can be set for 4 hours such that after 4 hours of operation, power to the light modules can be disconnected y the line control modules to turn the light modules off). The light show rate selection switch can be activated by the user to cause the processing device to execute a rate selection operation to allow the user to set and/or adjust a rate at which light modules operatively coupled to the line control module 110 cycles through the colors of the light show. One or more of the mode selection switches 242 can be activated to implement additional and/or different operations that can be performed by the line control module. For example, one or more of the mode selection switches 242 can be activated to reset an operation of the line control module, resynchronize an output of each light module to the AC cycle of the line voltage, and/or any can be activated to implement any other suitable operations. In some embodiments, multiple switches can be activated substantially simultaneously to implement one or more operations supported by the line control module 110. The mode selection switches 242 can be implemented as buttons, rocker switches, pressure switches, capacitive switches, and as any other type of switches that can be actuated by a user.

The rotary encoder 244 can include a shaft and a push button. The shaft can be rotated clockwise or counterclockwise by a user to allow the user to interact with the line module to preview and/or adjust one or more settings associated with the line control module 110 and/or the light modules operatively coupled to the line control module 110. The push button can be activated by a user to allow the user to specify or select values using the shaft of the rotary encoder. As a non-limiting example, the rotary encoder 244 can be used to control parameters or settings associated with a rate of the light show being output by the light modules, a brightness of the output of the light modules, a time period during which the light modules can operation, and/or can allow the user to preview and/or activate a light show to be output by the light modules.

The indicators 246 can be controlled by the processing device 230 in response to an interaction between a user and the mode selection switches 242 and/or the rotary encoder 244 such that the processing device 230 energizes or de-energizes one or more of the LEDs 248 to correspond to inputs received by the user via the mode selection switches 242 and/or the rotary encoder 244. In exemplary embodiments, the indicators 246 can be used by the processing device 230 of the line control module 110 to represent parameters or values associated with different functions/operations of the line control module 110 and/or the light modules 140 (FIG. 1).

As one example, when a user initiates a brightness/dimming operation by selecting one of the mode selection switches 242 (e.g., the brightness selection switch), the processing device 230 can energize a quantity of the LEDs 248 corresponding to a current, set intensity/brightness of the output of the light modules. When the user rotates a shaft of the rotary encoder, clockwise or counterclockwise, the processing device 230 can receive signals from the rotary encoder 244 and can control the LEDs 248 in response to the signals to increase or decrease the quantity of LEDs 248 that are energized to correspond to a brightness setting specified by the user's interaction with the rotary encoder 244 (e.g., all of the LEDs 248 can be energized by the processing device 230 when the brightness is set to a maximum, and one of the LEDs can be energized by the processing device 230 when the brightness is set to a minimum).

As another example, when a user initiates a rate selection operation by selecting one of the mode selection switches 242 (e.g., the rate selection switch), the processing device 230 can energize a quantity of the LEDs 248 corresponding to a current, set color transition rate for the output of the light modules. In some embodiments, when the user rotates a shaft of the rotary encoder, clockwise or counterclockwise, the processing device 230 can receive signals from the rotary encoder 244 and can control the LEDs 248 in response to the signals to increase or decrease the quantity of LEDs 248 that are energized to correspond to a rate setting specified by the user's interaction with the rotary encoder 244 (e.g., all of the LEDs 248 can be energized by the processing device 230 when the rate is set to a maximum, and one of the LEDs can be energized by the processing device 230 when the rate is set to a minimum). In some embodiments, when the user actuates the rate selection switch, the LEDs 248 can be energized and de-energized to generate a light chase sequence, where the rate of the chase sequence can correspond to a rate of the light show. When the user rotates shaft of the rotary encoder 244, clockwise or counterclockwise, the rate of the chase sequence can change to indicate a change to the rate of the light show being output by the light modules (e.g., the rate of the chase sequence can increase when the shaft is rotated clockwise and can decrease when the shaft is rotated counterclockwise.

As another example, when a user initiates a light show selection operation either by selecting one of the mode selection switches 242 (e.g., the light selection switch) or interacting with the rotary encoder 244, the processing device 230 can energize one of the LEDs 248 that corresponds to a current light show being output by the light modules. Alternatively, the LED corresponding to the current light show being output may already be energized.

When the user rotates a shaft of the rotary encoder, clockwise or counterclockwise, the processing device 230 can receive signals from the rotary encoder 244 and can control the LEDs 248 in response to the signals to energize one of the LEDs 248 that corresponds to a light show specified by the user's interaction with the rotary encoder 244 (e.g., each of the LEDs 248 can correspond to a particular light show that can be output by the light modules, and the LED that is energized by the processing device 230 can correspond to the light show currently being output by the light modules or a light show that may be output by the light modules in response to a user's interaction with the rotary encoder).

The preview circuit 250 can be configured to output light on the line control module 110 via a preview window that allows a user to preview a light show in response to an interaction between the user and the rotary encoder 244 before (as well as after) the user activates the light show and the line control module 110 issues commands to the light modules to output the activated light show. In exemplary embodiments, the preview circuit 250 can include one or more LED drivers 252 and one or more LEDs 254 (e.g., one or more red LEDs, one or more green LEDs, and one or more blue LEDs, one or multi-color LEDs). The LEDs 254 can be illuminated in response to drive signals received from the processing device 230 via the LED drivers 252. The preview circuit 250 can be controlled by the processing device 230 to simulate a light show that can be output by the light modules such that a user is not required to view an operation of the light modules to determine what a light show looks like; thereby allowing the line control module 110 to be positioned such that the light modules are not directly observable by a user who is interacting directly with the line control module 110.

The ambient sensing circuit 260 can be configured to sense an intensity of ambient light incident on at least a portion of the line control module 110 from the environment within which the line control module 110 is disposed. For example, the line control module can be disposed in an interior wall of a room in a building or can be disposed outside of a building such that the light incident upon the line control module 110 can depend on whether lights are on in the building and/or whether it is light or dark outside of the building. The sensed intensity of the light can be used by the line control module 110 to adjust a brightness of one or more of the LEDs 248 and/or 254 to compensate for the ambient light of the environment.

The synchronization circuitry 270 can include a current sense circuit 272 and a voltage sense circuit 274, and can be configured to identify zero crossings of the current and voltage associated with the line voltage and/or to identify peak voltages associated with the line voltage. In exemplary embodiments, the current sense circuit 272 and the voltage sense circuit 274 of synchronization circuitry 270 can be configured to generate sense signals that are output to the processing device 230, which can execute the firmware 212 to process the sense signals and to coordinate power interruptions with the sense signals to facilitate transmission of commands to the light modules. For example, in some embodiments, the processing device 230 can synchronize power disconnects and reconnects with zero crossings of the line voltage. In exemplary embodiments, the current sense circuit 272 measures how much current is flowing to the transformer 120 (FIG. 1) and may disconnect the output switches 290 if an overload condition is detected. The processing device 230 can then periodically turn the output switches 290 ON to determine if the overload condition persists.

The wireless transceiver 280 can include a radio frequency (RF) transmitter, an RF receiver, and at least one antenna. The wireless transceiver 290 can be configured to allow the line control module 110 to wirelessly communicate with other devices. As one example, in exemplary embodiments, the processing device 230 of the line control module 110 can execute the firmware 212 to wirelessly transmit, via the transmitter of the wireless transceiver, information or data, such as a state of the lighting system (e.g., whether the lighting system is on or off, a light show being output by the lighting system, an operation schedule of the lighting system, etc.), to one or more devices, such as a mobile phone, tablet PC, laptop, and/or any other devices configured for wireless communication. As another example, the transceiver of the wireless transceiver 280 can receive information or data, such as commands or instructions for controlling an operation of the lighting system (e.g., to turn the lighting system on or off, to control which light show to output from the lighting system, to set an operation schedule of the lighting system, etc.), from one or more devices, such as a mobile phone, tablet PC, laptop, and/or any other devices configured for wireless communication. In some embodiments, a wireless receiver can be used instead of a wireless transceiver such that the line control module can be configured to wirelessly receive information or data, and not to wireless transmit information or data.

In exemplary embodiments, the wireless transceiver 280 can be a Bluetooth® transceiver, such as the RN4020 Bluetooth® transceiver from Microchip Technology, Inc., configured to facilitate wireless communication in a frequency range of approximately 2.4 to approximately 2.485 GHz. While exemplary embodiments of the wireless transceiver 280 can be utilize the Bluetooth® communication protocol, those skilled in the art will recognize that the wireless transceiver can be utilized other wireless communication protocols instead of, or in addition to, the Bluetooth® transceiver. For example, in exemplary embodiments, the wireless transceiver can be configured to operate according to WiFi communication protocols, such as those specified by the Institute of Electrical and Electronics Engineers' (IEEE) 802.11 standards.

The output switches 290 can be operatively coupled to the line voltage path and can operate to selectively open and close/complete the circuit of the lighting system to control the power to the lighting system (e.g., by disconnecting the line voltage and connecting the line voltage, respectively). The output switches 290 can be controlled in response to one or more control signals output by the processing device 230 based on an execution of the firmware 212 and/or based on an interaction between the user and the user interface 240. For example, the processing device 230 can execute the firmware 212 to control output switches 290 according to a selected light show to be output by the light modules, a brightness of the output of the light modules, a rate at which the light modules transition between colors of a light show, and the like. In exemplary embodiments, the control signals can be used to control the operation of the output switches 290 to disconnect and connect the line voltage to the light modules to generate commands that can be processed by the light modules of the lighting system to cause the light modules to perform one or more operations/functions. In exemplary embodiments, the output switches 290 can be implemented as electro-mechanical switches, such as relays, or solid states switches formed by transistors (e.g., MOSFETs).

Figure 2B:
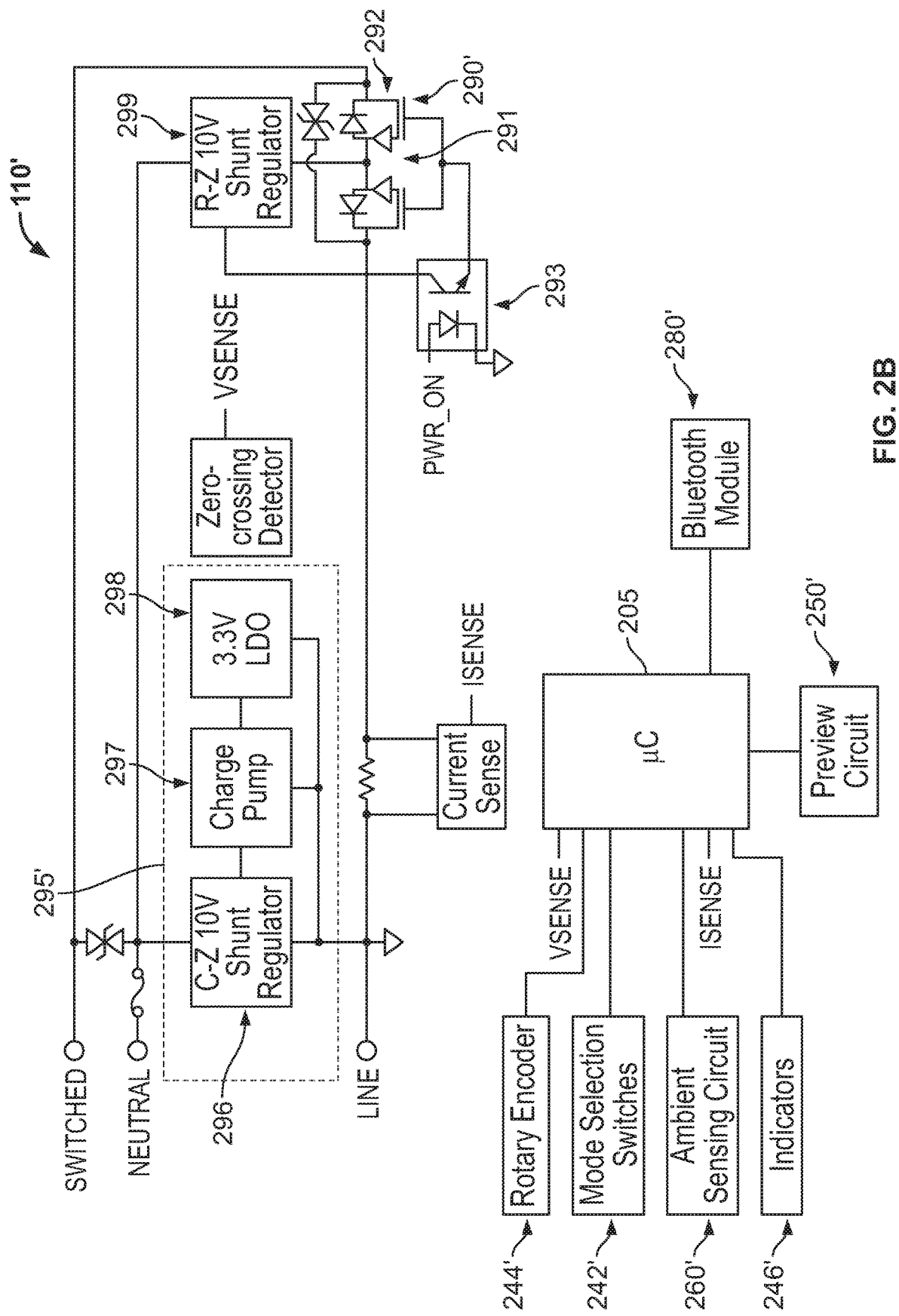
FIG. 2B is a block diagram showing various components of a line control module in accordance with exemplary embodiments of the present disclosure.

FIG. 2B is a block diagram showing various components of a line control module 110' in accordance with exemplary embodiments of the present disclosure. In exemplary embodiments, the line control module 110' can operate and function as described herein with respect to the line control module 110. As shown in FIG. 2B, the line control module 110' includes a line (or hot) input, a neutral input, and a switched output that provides selectively power to lighting modules. The line control module includes a microcontroller 205, which includes a processing device and a non-transitory computer-readable medium storing firmware as described herein. Output switches 290' are formed by two transistors 291 and 292, the gates of which can be selectively controlled by a control signal (e.g., PWR_ON in the present example) from the microcontroller 205 which is provided to the gates via an opto-coupler 293. Power supply circuitry 295' can be formed by a zener-diode based shunt regulator 296, a charge pump 297, a voltage regulator 398 (e.g., a low-dropout regulator), and a zener-diode based shunt regulator 299. The line control module 110' can also include mode selection switches 242', the rotary encoder 244', the indicators 246', the light show preview circuit 250', the ambient sensing circuit 260', and the wireless transceiver 280' (e.g., a BlueTooth® module).

Figure 3A:
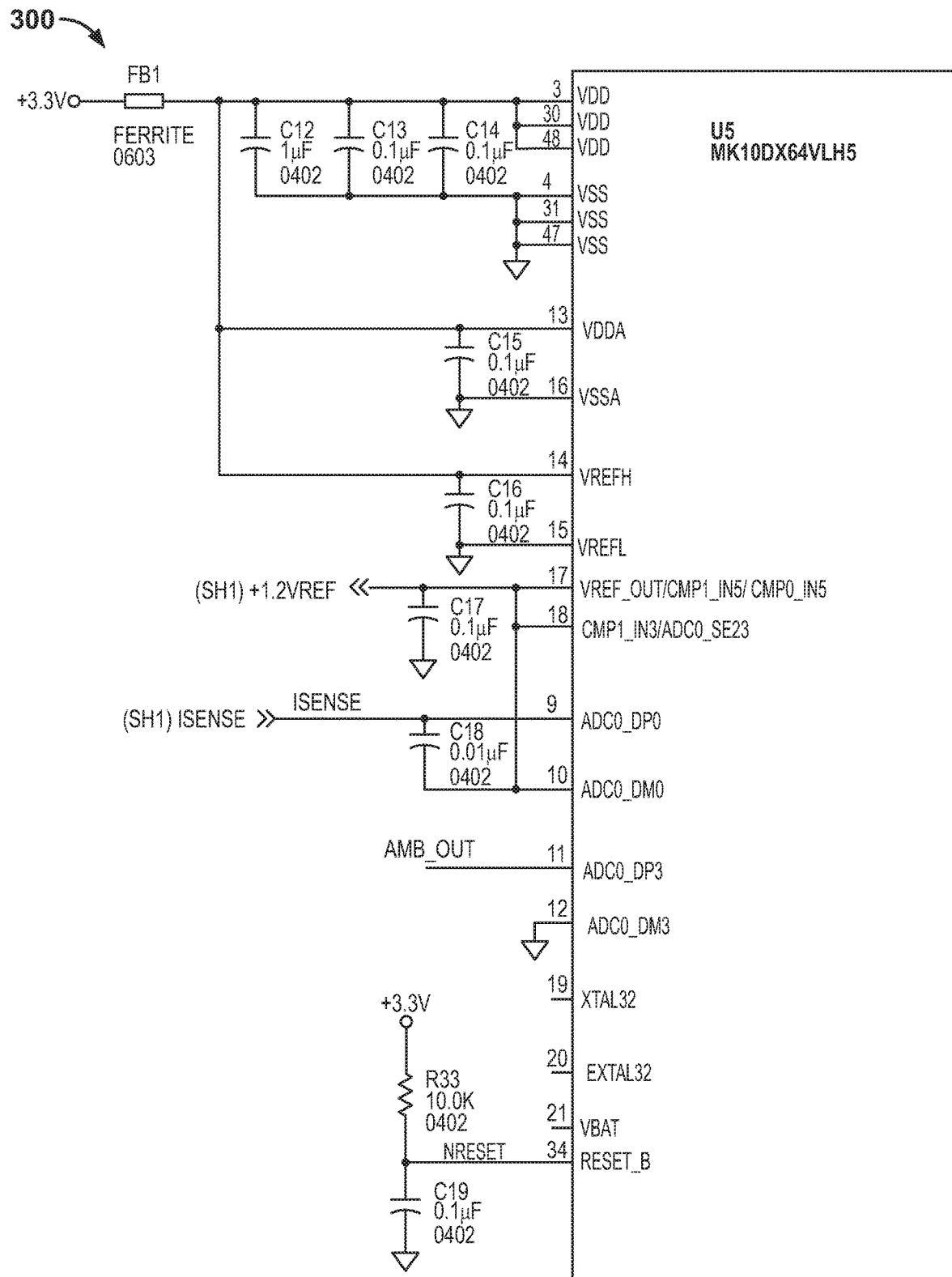
FIGS. 3A-H depict exemplary schematics of a line control module in accordance with exemplary embodiments of the present disclosure.
Figure 3B:
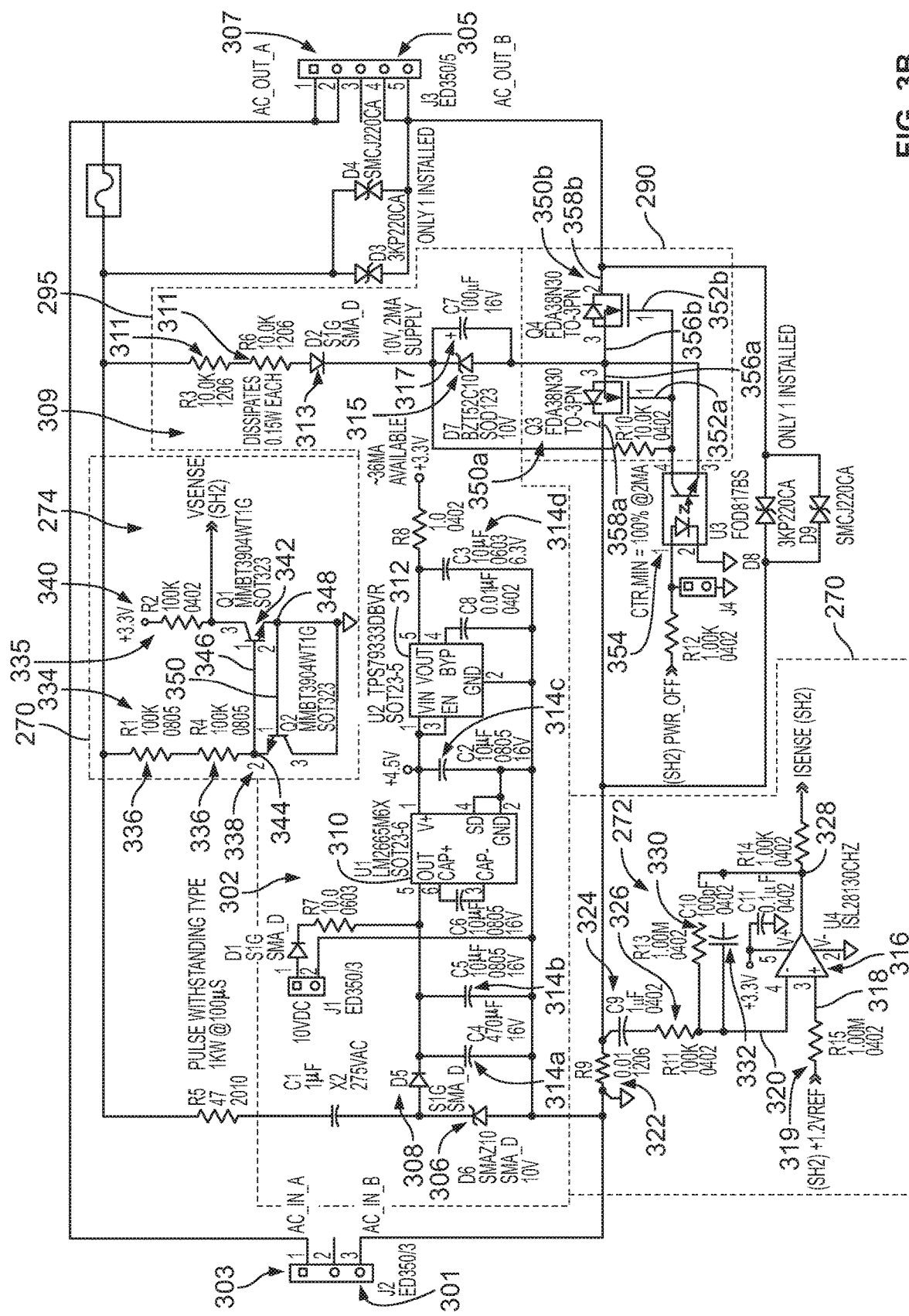

FIGS. 3A-H depict schematic of the circuitry of exemplary embodiments of the line control module 110 in accordance with the present disclosure. FIG. 3A depicts an exemplary microcontroller 300, such as the MK10DX64VLH5 microcontroller from Freescale Semiconductor, Inc., which includes a processing device and a computer-readable medium for storing the firmware (e.g., firmware 212) and the light show programs (e.g., light show programs 214). FIG. 3B depicts exemplary power supply circuitry 295, synchronization circuitry 270, and output switches 290. As shown in FIG. 3B, the line control module can have inputs 301 and 303 connected to the line voltage and the neutral associated with a mains power supply, respectively, and outputs 305 and 307 connected to, for example the low voltage transformer of the lighting system.

Referring to FIG. 3B, the power supply circuitry 295 includes power supply circuits 302 and 309 that generate DC voltages to power various components of the line control module 110. In the present embodiment, the power supply circuit 302 includes a zener diode 306, a diode 308, a charge pump 310, a voltage regulator 312, and a reservoir capacitor 314*a*. The zener diode 306 is operatively coupled to an input of the voltage regulator 310 through the diode 308. The zener diode 306 can operate to clip the AC line voltage received by the line control module from the mains power supply to generate a clipped/clamped waveform having a peak voltage corresponding to the zener voltage of the diode (e.g., 10 volts) and the diode 308 rectifies the clipped/clamped waveform generated by the zener diode 306 such that the output of the rectifying diode forms the input of the charge pump 310. A capacitor 307 is implemented as a current limiting capacitor.

Reservoir capacitors 314*a* can be charged to approximately the zener voltage to smooth the rectified waveform generated by the diode 308 to generate a generally steady DC voltage that is approximately equal to the zener voltage (e.g., 10 volts DC). An output of the charge pump 310 represents a DC voltage (e.g., approximately 4.5 volts DC) that is supplied to some components in the line control module and also forms the input to the voltage regulator 312, which generates another DC voltage (e.g., approximately 3.3 volts DC) that is supplied to other components of the line control module.

Figure 3C:
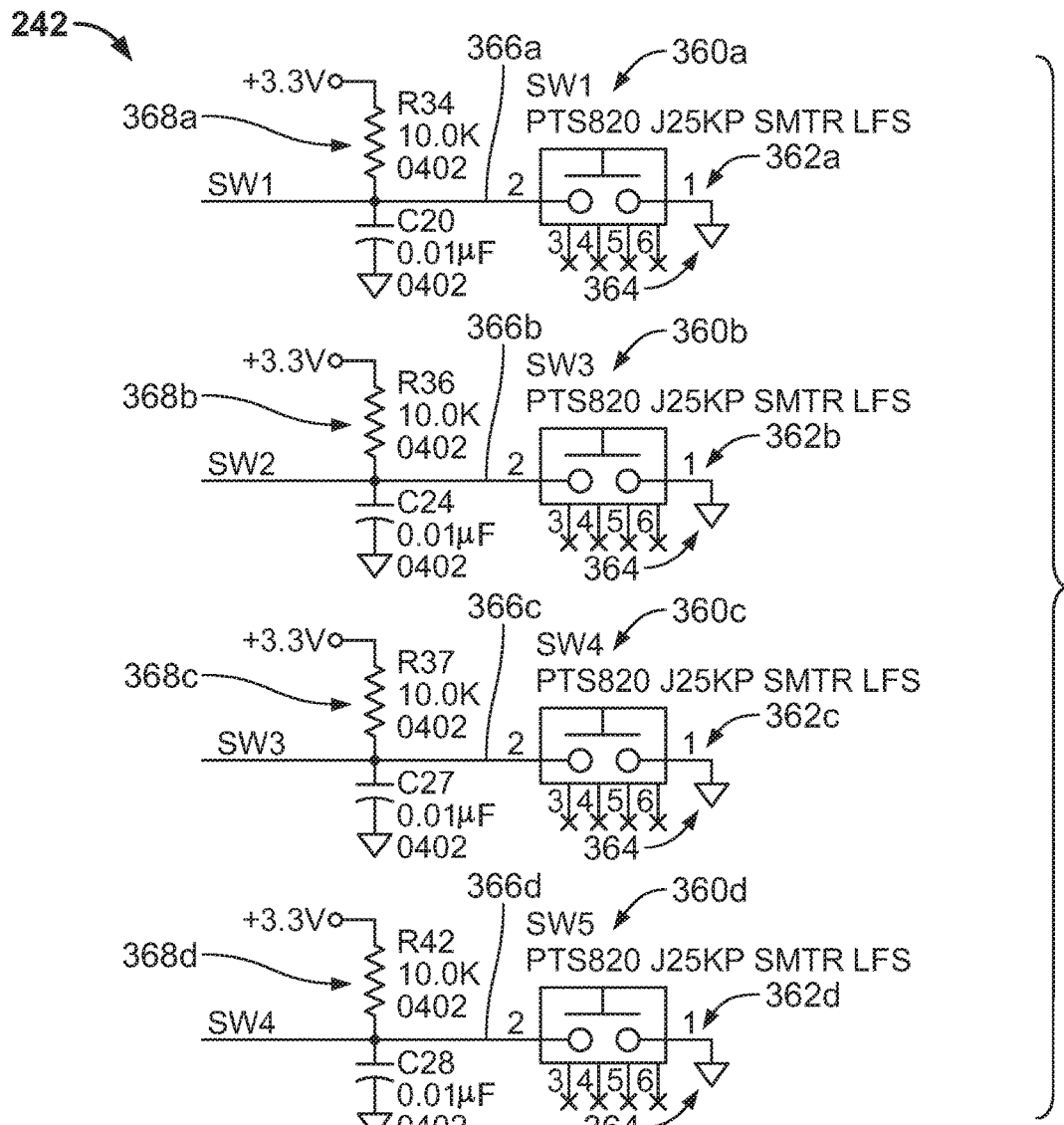
Figure 3D:
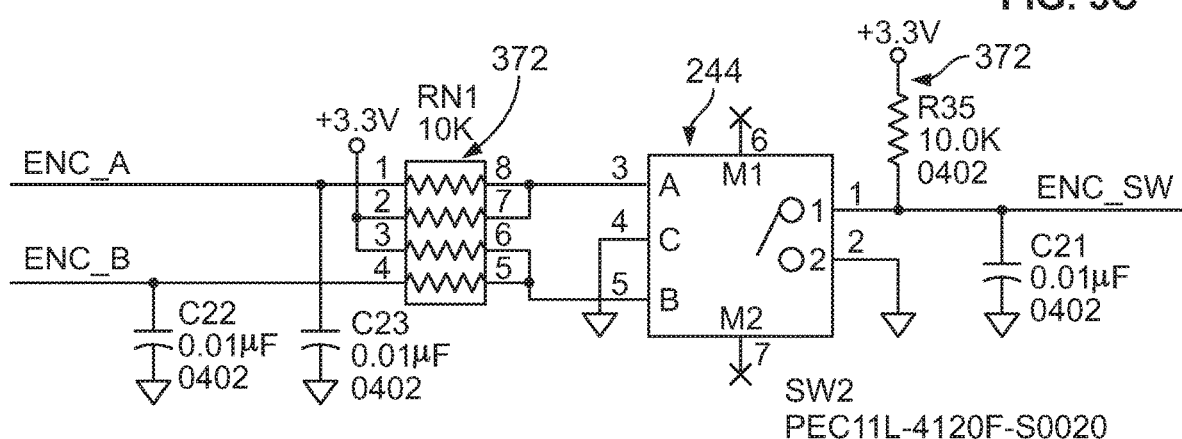
Figure 3E:
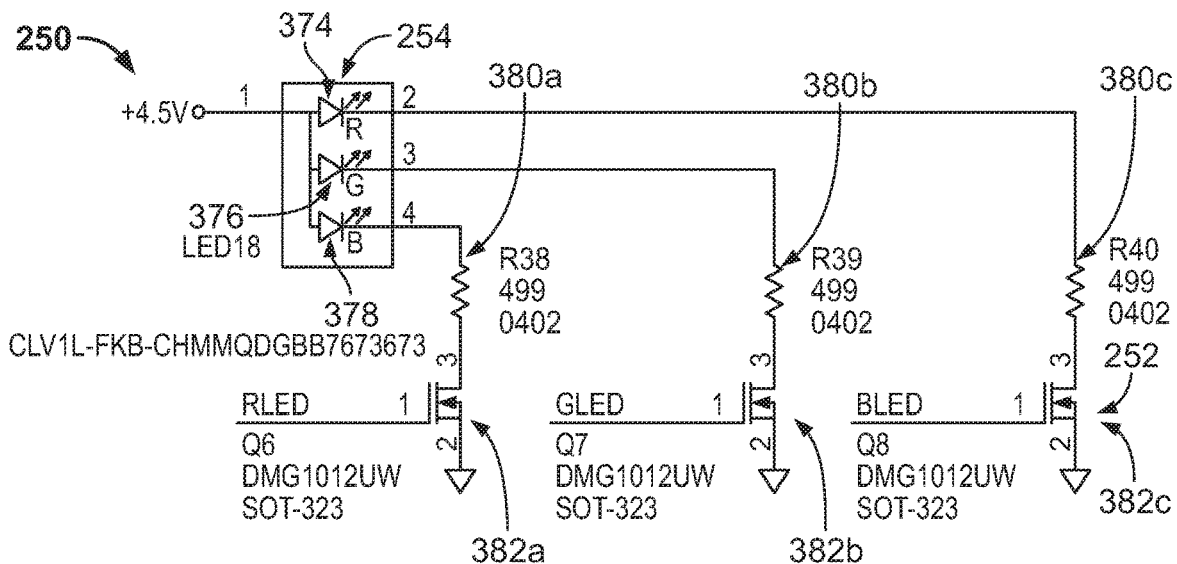
Figure 3F:
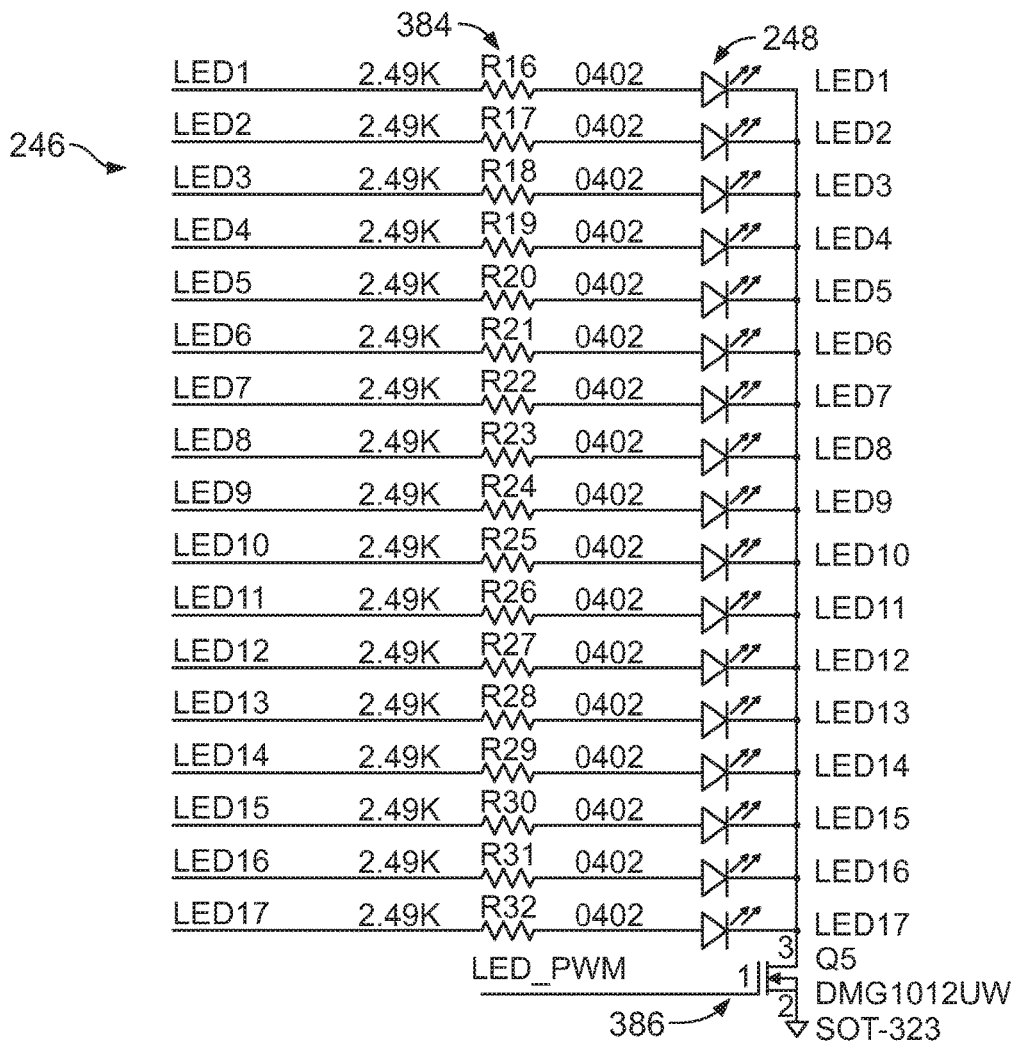
Figure 3G:
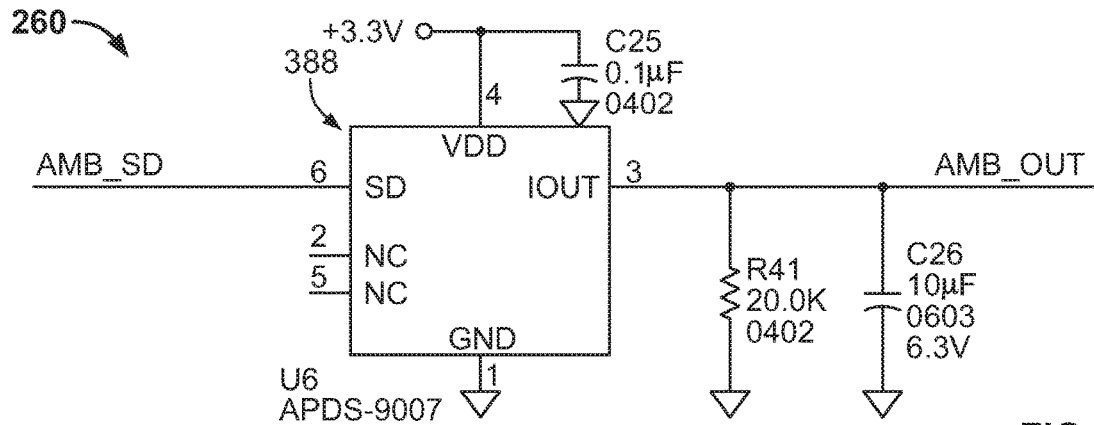
Figure 3H:
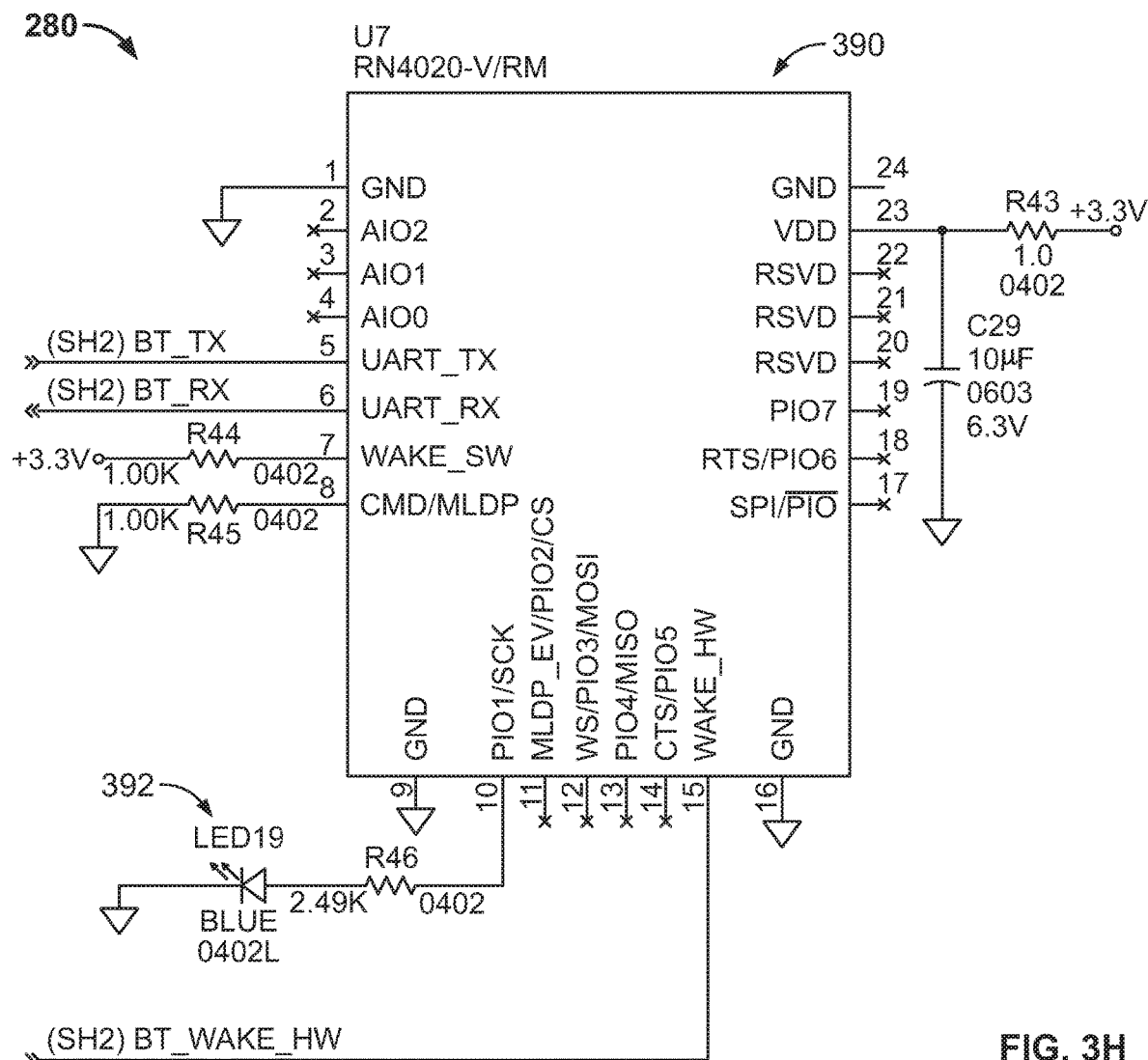

In exemplary embodiments, the DC voltage output by the charge pump 310 can be supplied to the preview circuitry (FIG. 3E), and the DC voltage output by the voltage regulator 312 can be supplied to the current sense circuitry 272, the voltage sense circuitry 274, the microprocessor 300 (FIG. 3A), the mode selection switch circuitry (FIG. 3C), the rotary encoder circuitry 244 (FIG. 3D), ambient sensor circuit 260 (FIG. 3G), and the wireless transceiver circuitry 280 (FIG. 3H). A non-limiting example of a voltage regulator that can be used for the voltage regulator charge pump 310 can be the LM2665M6X voltage regulator from Texas Instruments, Inc., and a non-limiting example of a voltage regulator that can be used for the voltage regulator 312 can be the TPS79333DBVR from Texas Instruments, Inc.

The power supply circuit 309 can be formed from resistors 311 in series with a diode 313, a zener diode 315, and a reservoir capacitor 317. The diode 313 generates a rectified waveform of the line voltage, and the zener diode 315 clips/clamps the rectified waveform at the zener voltage (e.g., 10 volts). The reservoir capacity 317 charges to the zener voltage to generate a DC voltage (e.g., 10 volts) that can be supplied to the output switches 290.

The current sensor circuitry 272 of the synchronization circuit 270 can be formed by an operational amplifier 316 configured as an inverting amplifier. A positive terminal 318 of the operational amplifier 316 is operatively coupled to a DC reference voltage via a resistor 319. A negative terminal 320 of the operational amplifier 316 is operatively coupled to the line voltage via a series circuit including a capacitor 324, and a resistor 326. An output terminal 328 of the operational amplifier 316 is operatively coupled to the negative terminal 320 of the operational amplifier 316 via a resistor 330 and a capacitor 332 in a parallel configuration to form a negative feedback path between the output terminal 328 and the negative terminal 320. The output of the operational amplifier 316 corresponds to the current flowing through the line voltage path between the input and output of the line control module, and is provided as an input to the microcontroller 300 as a control signal (ISENSE), which can be processed by the microcontroller to determine whether the lighting system is drawing a current that exceeds a threshold current to determine when to disconnect and/or reconnect the line voltage from the lighting system.

Voltage sense circuitry 274 of the synchronization circuit 270 can be formed by a current mirror that includes a first leg 334 and a second leg 335. The first leg 334 is connected between the line voltage and ground, and has resistors 336 (e.g., 100 kilo-ohm resistors) disposed in series with a (bipolar junction) transistor 338. The second leg 335 is connected between the DC voltage output by the voltage regulator 312 (e.g., approximately 3.3 volts) and ground, and has a resistor 340 (e.g., 100 kilo-ohm resistor) disposed in series with a (bipolar junction) transistor 342. An emitter 344 of the transistor 338 in the first leg 334 is coupled to a base 346 of the transistor 342 in the second leg 335, and an emitter 348 of the transistor 342 in the second leg 335 is coupled to a base 350 of the transistor 338 in the first leg 334. The AC line voltage is applied to the base 346 through the current limiting resistors 336. When the AC line voltage is positive, the transistor 342 turns on and VSENSE goes LOW. When AC line voltage is negative, the transistor 342 turns off and VSENSE goes HIGH. As such, the voltage sense circuitry can operate to determine when a zero crossing occurs in the AC line voltage The transistor 338 protects base-emitter junction of the transistor 342 from breaking down during negative half cycle.

The output switches 290 can be disposed in series in the line voltage path between an input of the line control module and an output of the line control module. As shown in FIG.

3B, the output switches 290 can be formed from N-channel, enhancement mode, metal oxide semiconductor field effect transistors (MOSFETs) 350a and 350b. The gates 352a and 352b of each MOSFET 350a and 350b, respectively, are coupled to an output of an opto-isolator 354, through which the MOSFETs 350a and 350b receive a control signal (PWR_OFF) from the microcontroller 300 to turn the MOSFETs on and off. The sources 356a and 356b of each MOSFET 350a and 350b, respectively, are coupled to each other. The drain 358a of the MOSFET 350a is operatively coupled to the input 301 of the line control module that receives the line voltage via the mains power supply, and the drain 358b of the MOSFET 350b is operatively coupled to the output 305 of the line control module that connects the line voltage to the low voltage transformer. When the MOSFETs 350a and 350b are in the off (non-conductive) state, the line control module disconnects the line voltage from the output of the line control module. When the MOSFETs 350a and 350b are in the on (conductive) state, the line control module connects the line voltage to the output of the line control module to supply the line voltage to the lighting system.

Referring now to FIG. 3C, the line control module can include mode selection switches 242 in the form of push button switches 360a-d, each having terminals 362a-d connected to ground 364 and terminals 366a-d connected to a pull-up circuits 368a-d and the microcontroller 300, respectively, such that when the switches are "closed" signals (e.g., SW1, SW2, SW3, SW4) to the microcontroller 300 are at ground 364, and when the switches 360a-d are "open" the signals (e.g., SW1, SW2, SW3, SW4) to the microcontroller 300 are at a DC voltage (e.g., 3.3 volts) output by the power supply circuit 302. The microcontroller 300 can be programmed to execute the firmware to perform one or more operations in response an activation of any one or more of the switches as described herein. In exemplary embodiments, the switch 360a can be a light show selection switch that can be activated by the user to cause the processing device 230 to execute a light show selection operation to allow the user to select a light show to be output by light modules operatively coupled to the line control module 110; the switch 360b can be a brightness selection switch that can be activated by the user to cause the processing device to execute a brightness operation to allow the user to set and/or adjust a brightness/dimness of the light output by light modules operatively coupled to the line control module 110; the switch 360c can be a timer selection switch that can be activated by the user to cause the processing device 230 to execute a timer operation to allow the user to initiate, set, and/or cancel a timer that controls when the light modules output light shows; and the switch 360d can be a light show rate selection switch that can be activated by the user to cause the processing device to execute a rate selection operation to allow the user to set and/or adjust a rate at which light modules operatively coupled to the line control module 110 cycles through the colors of the light show. One or more of the switches 360a-d can be activated to implement additional and/or different operations that can be performed by the line control module. For example, one or more of the switches 360a-d can be activated to reset an operation of the line control module, resynchronize an output of each light module to the AC cycle of the line voltage, and/or any can be activated to implement any other suitable operations. In some embodiments, multiple switches can be activated substantially simultaneously to implement one or more operations supported by the line control module 110. While the switches 360a-d have been described as push buttons, those skilled in the art will recognize that the switches 360a-d can be implement use any suitable type of switch including, but not limited to rocker switches, pressure switches, capacitive switches, and as any other type of switches that can be actuated by a user.

FIG. 3D depicts exemplary rotary encoder 244 of an embodiment of the line control module. In some embodiments, the rotary encoder 244 can be the PEC12R-3220F-S0024 or the PEC11L-4120F-S0020 rotary encoder from Bourns, Inc., that can include a rotatable shaft with a push button. The rotary encoder 244 can be configured to generate output signals (ENC_A and ENC_B) in response to a rotation of the shaft and an output signal (ENC_SW) in response to an activation of the push button. Each of the outputs can be electrically coupled to the DC voltage output from the voltage regulator 312 via a pull-up resistor 372. The output signals (ENC_A and ENC_B) generated in response to a rotation of the shaft can be input the microcontroller 300 (FIG. 3A), which can process the signals to correlate the rotation of the shaft to a selection by a user, as described herein, for example, when specifying, a light show, brightness, rate of the light show, a time period during which the light modules are on, and the like. The output signal (ENC_SW) generated in response to an activation of the push button can be input to the microcontroller 300, which can process the signal to determine when a user has selected, set, or activated a light show, brightness value, a rate value of the light show, a time period during which the light modules are on, and the like.

FIG. 3E depicts preview circuitry 250 of an embodiment of the line control module. As shown in FIG. 3E, the preview circuitry 250 can include a multicolor LED 254 configured to output different colors using a red LED 374, green LED 376, and a blue LED 378. The preview circuit 250 can also include drivers 252, each of which are formed by a resistors 380a-c and a transistor 382a-c. In operation, the DC voltage output by the voltage regulator 310 of the power supply circuit 302 is operatively coupled to the LEDs 374, 376, and 378, and the transistors 382a-c are configured as switches to turn the LEDs 374, 376, and 378 on and off, respectively, and to control a current flowing through LEDs 374, 376, and 378 to control an intensity of the light output by the LEDs 374, 376, and 378, respectively. The gates of the transistors 382a-c can be driven by control signals (RLED, GLED, and BLED) output by the microcontroller 300 in response to the output signals (ENC_A, ENC_B, and/or ENC_SW) received by the microcontroller 300 from the rotary encoder device 370 when the user choses to preview and/or activate light shows in the lighting system.

FIG. 3F depicts indicators 246 of an embodiment of the line control module. As described herein, the indicators 246 include LEDs 248. The anodes of the LEDs 248 are operatively coupled to the microcontroller 300 via resistors 384, and the cathodes of the LEDs 248 are operatively coupled to a drain of a transistor 386. A source of the transistor 386 is operatively coupled to ground and a gate of the transistor 386 is operatively coupled to the microcontroller 300 (FIG. 3A). In exemplary embodiments, the LEDs 248 can be disposed circumferentially about the shaft of the rotary encoder. The LEDs 248 are each driven by control signals (LED1-LED17) output by the microcontroller 300 such that the microcontroller 300 can control each of the LEDs 248 independently. The microcontroller 300 can output a control signal (LED_PWM), such as a pulse width modulated signal, to the gate of the transistor 386 to control an average current flowing through the LEDs 248, and therefore an intensity of the light being output by the LEDs 248 when the microcontroller 300 is driving the LEDs 248.

FIG. 3G depicts ambient sensor circuitry 260 of an embodiment of the line control module. The ambient sensor circuitry 260 can include a photodiode or photo sensor 388, such as the APDS-9007 ambient light photo sensor from Avago Technologies. The photo sensor 388 can receive the DC voltage output by the voltage regulator 312 (FIG. 3B). In exemplary embodiments, the photo sensor 388 can output a signal (AMB_OUT) to the microcontroller 300 that is based on the intensity of light incident on the photo sensor 388, and the photo sensor 388 can receive a control signal (AMB_SD) from the microcontroller 300, which can be provided by the microcontroller 300 to shut down the photo sensor 388. The signal (AMB-OUT) output by the photo sensor 388 can be processed by the microcontroller 300, which can control an intensity of the LEDs 248 and 254 of the indicator circuitry 246 and the preview circuitry 250, respectively.

FIG. 3H depicts wireless transceiver circuitry 280 of an embodiment of the line control module. As shown in FIG. 3H, the wireless transceiver circuitry 280 can include a wireless transceiver module 390, such as the RN4020-V/RM Bluetooth® Low Energy Module from Microchip Technology, Inc. The wireless transceiver module 390 can receive the DC voltage output by the voltage regulator 312 (FIG. 3B). In exemplary embodiments, the wireless transceiver module 390 can be operatively coupled to the microcontroller 300 to receive data signals (BT_TX) from the microcontroller 300 for wireless transmission, and can be operatively coupled to the microcontroller 300 to transmit data signals (BT_RX) to the microcontroller 300, which were wirelessly received. For example, the microcontroller 300 can transmit data associated the line control module and/or the lighting system to a wireless device via the wireless transceiver module, and can receive data (including commands or instructions) from the wireless device to control an operation of the line control module and/or the lighting system as described herein. The wireless transceiver module 390 can receive a control signal (BT_WAKE_HW) from the microcontroller 300 to control whether the wireless transceiver module 390 is "awake" or in "sleep" mode. In some embodiments, an output of the wireless transceiver module 390 can be operatively coupled to an LED 392. The LED 392 can be energized to indicate that a wireless device is "paired" with the wireless transceiver module 390 and/or that the wireless device and the line control module are in wireless communication with each other.

As would be appreciated by one skilled in the art, the present circuitry described with respect FIGS. 3A-H illustrate an exemplary non-limiting implementation of the line control module 110. Exemplary embodiments of the present disclosure can include different circuit configurations and/or components. For example, FIGS. 4A-D show alternative embodiments of circuitry that can implemented for various portions of the line control module 110' in accordance with exemplary embodiments of the present disclosure.

Figure 4A:
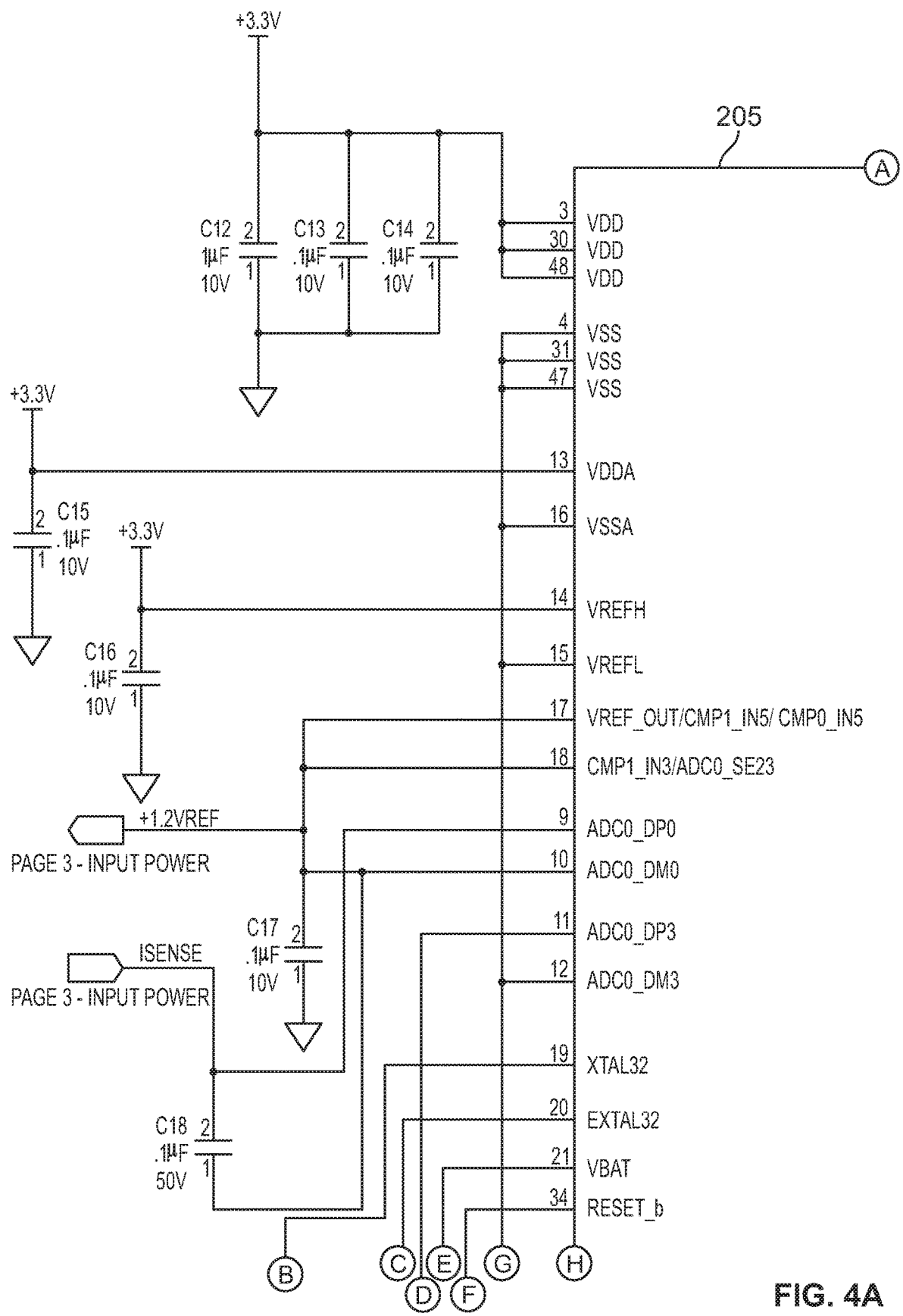
FIGS. 4A-D depict exemplary schematics of alternate line control module in accordance with exemplary embodiments of the present disclosure.
Figure 4A:
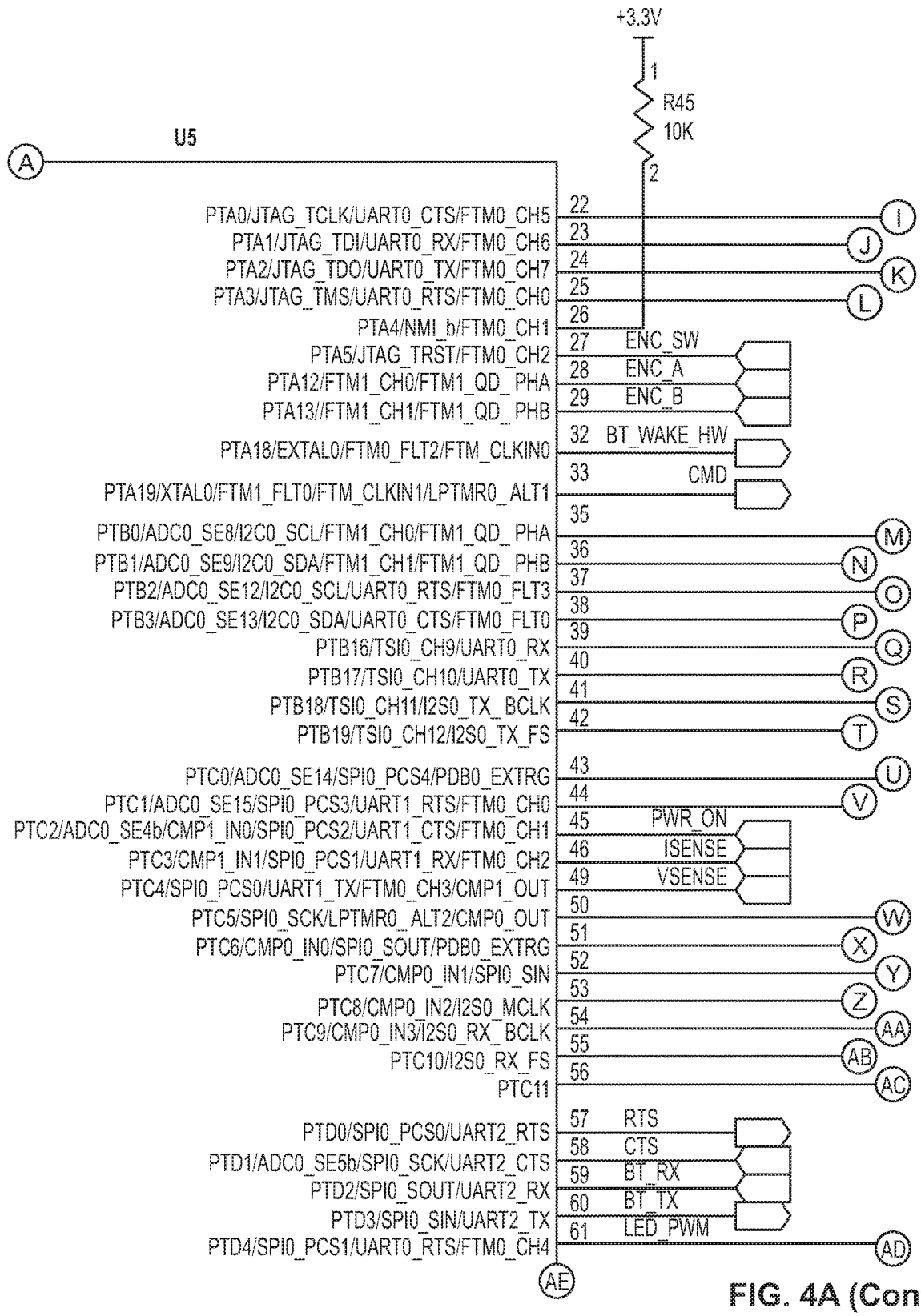
Figure 4A:
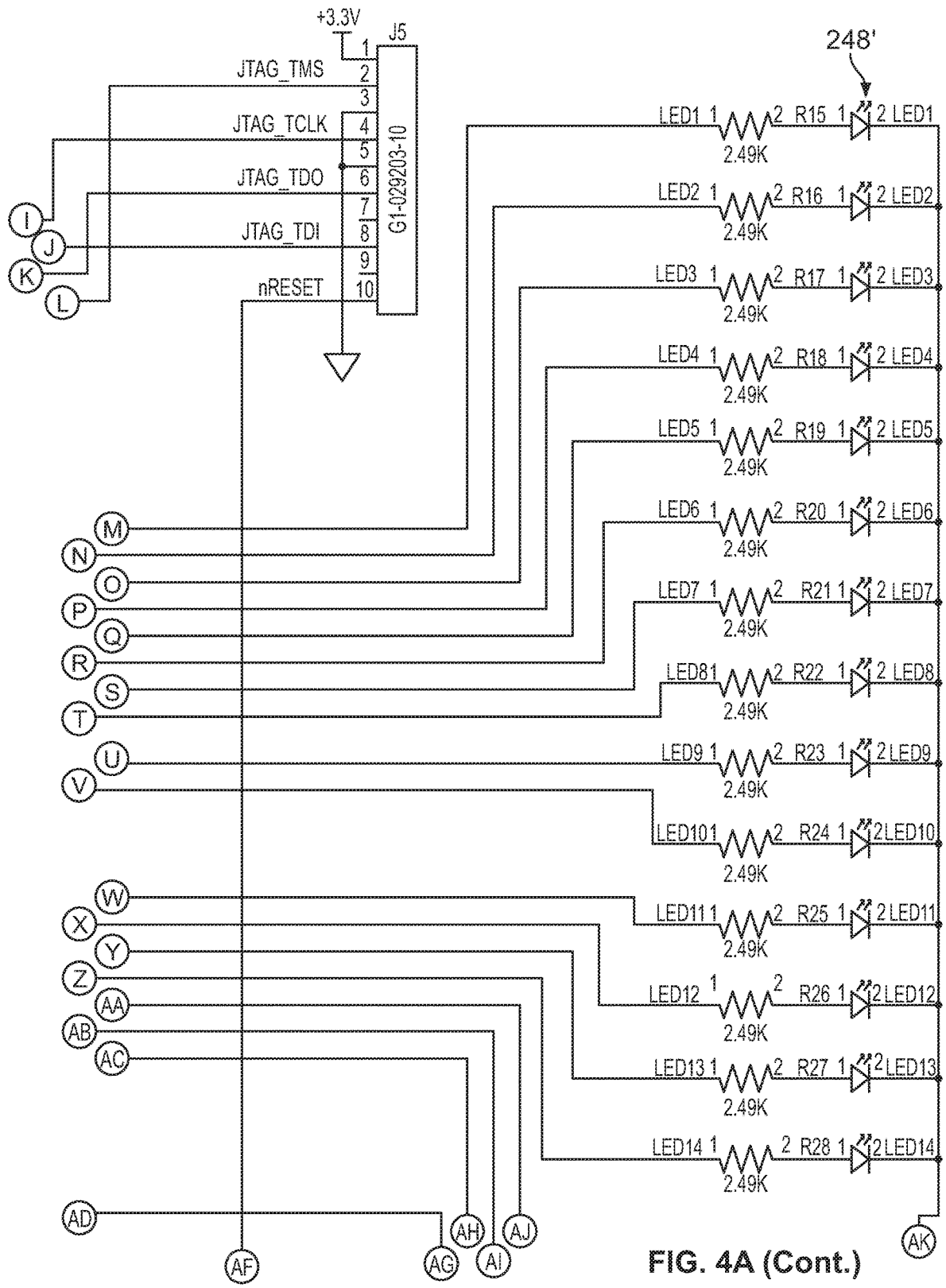
Figure 4A:
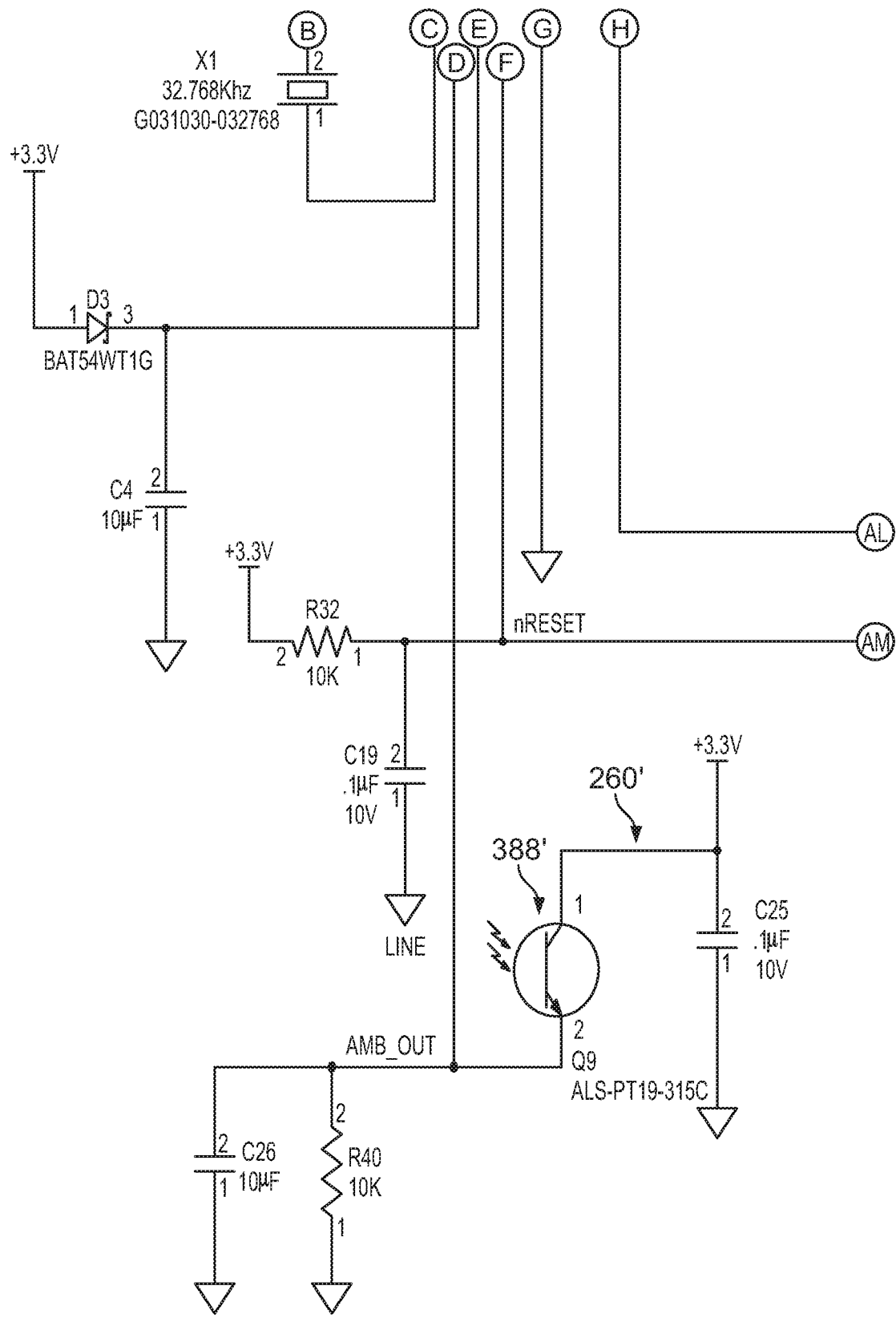
Figure 4A:
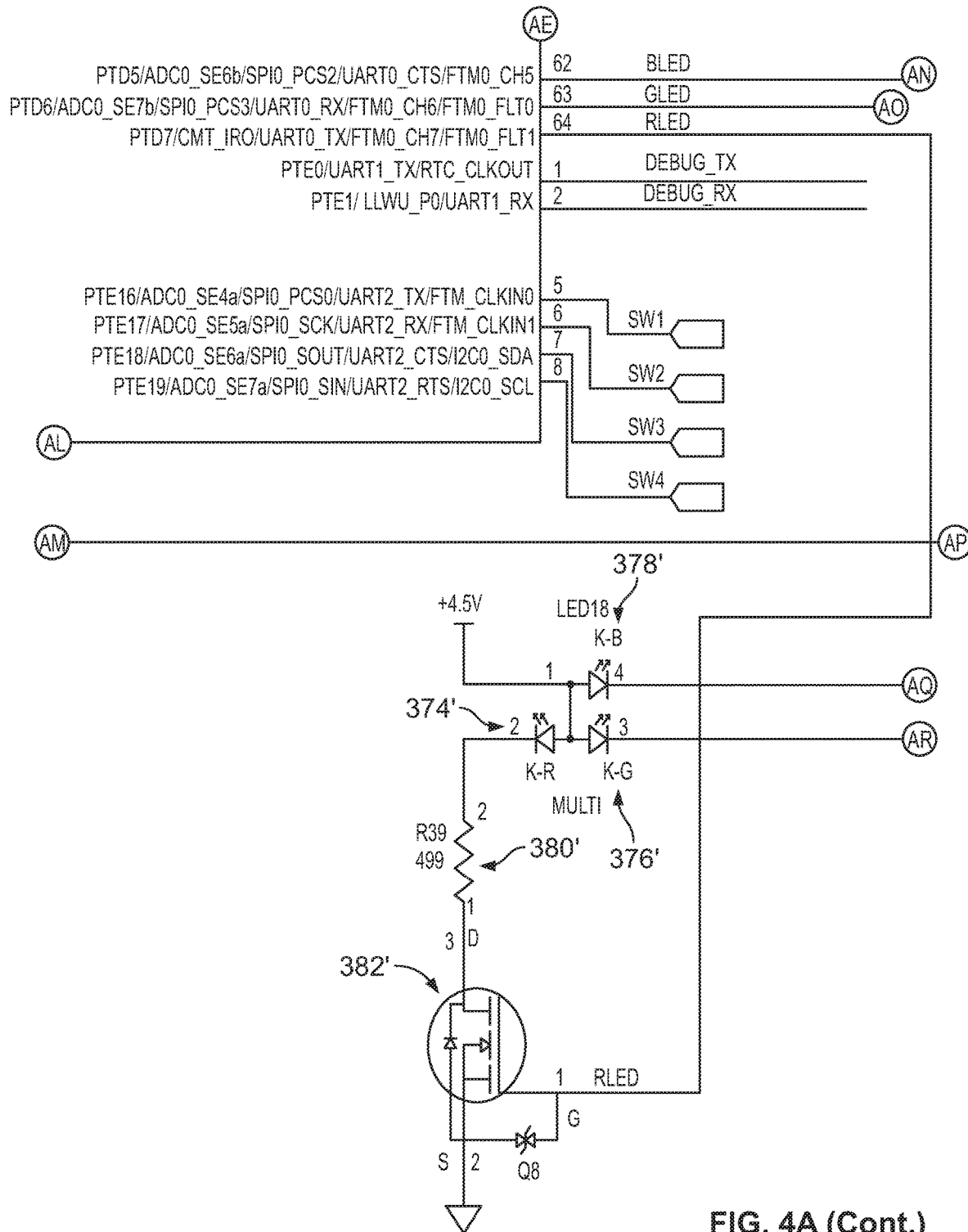
Figure 4A:
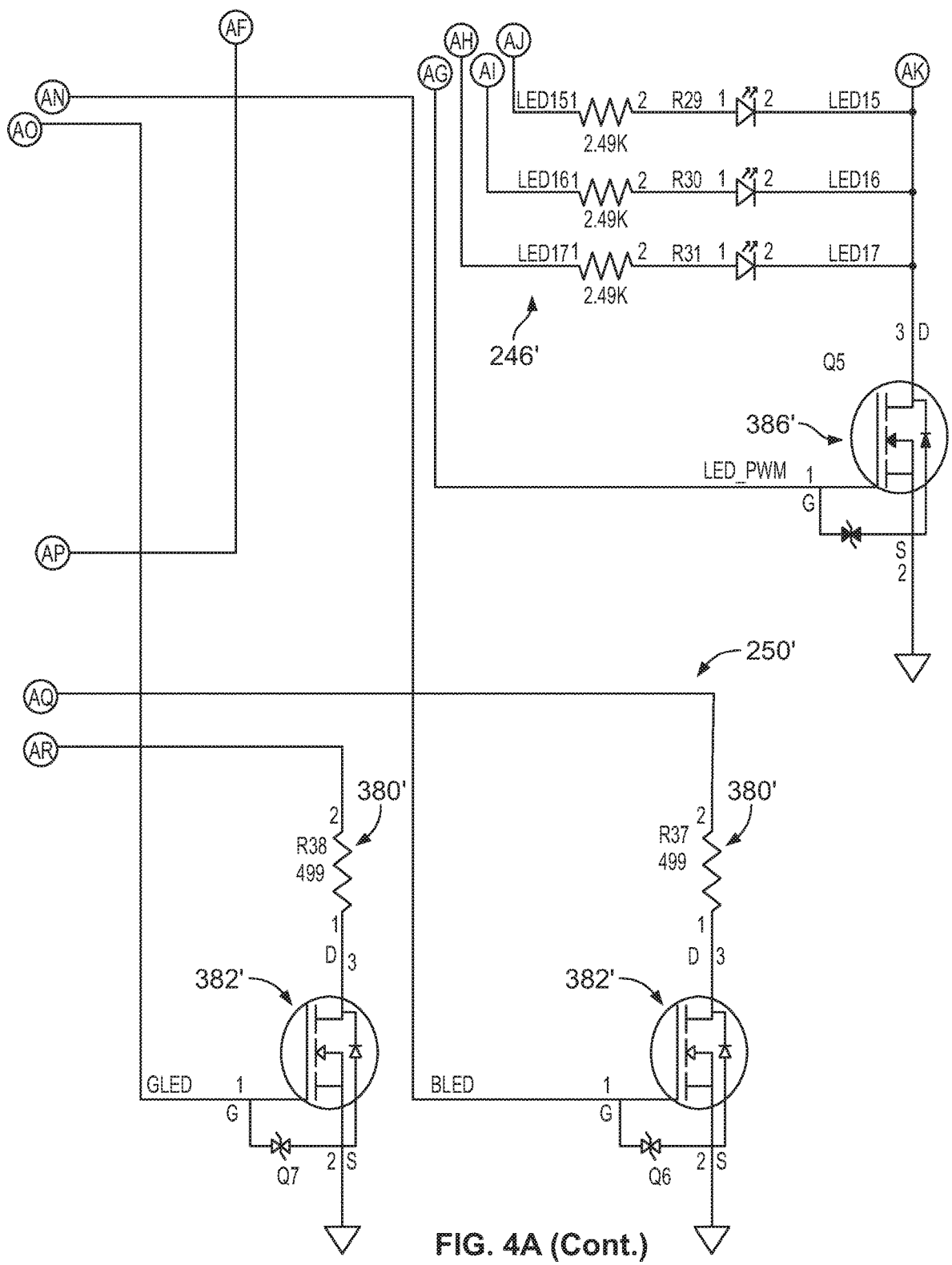

FIG. 4A depicts the microcontroller 205, which includes a processing device and a computer-readable medium for storing the firmware (e.g., firmware 212) and the light show programs (e.g., light show programs 214). FIG. 4A also shows exemplary embodiments of the indicators 246', preview circuitry 250', and ambient sensing circuitry 260'. As shown in FIG. 4A, the indicators 246' can include LEDs 248' that can be selectively controlled by control signals output by the microcontroller 205 and the operation of a transistor 386'; the preview circuit 250' can include a red LED 374', green LED 376', a blue LED 378', and drivers 252', each of which are formed by a resistors 380' and a transistor 382'; and the ambient sensing circuitry 260 can include an ambient sensor 388' that outputs a voltage or current to the microcontroller that is proportional to the light incident upon the ambient sensor 388'.

Figure 4B:
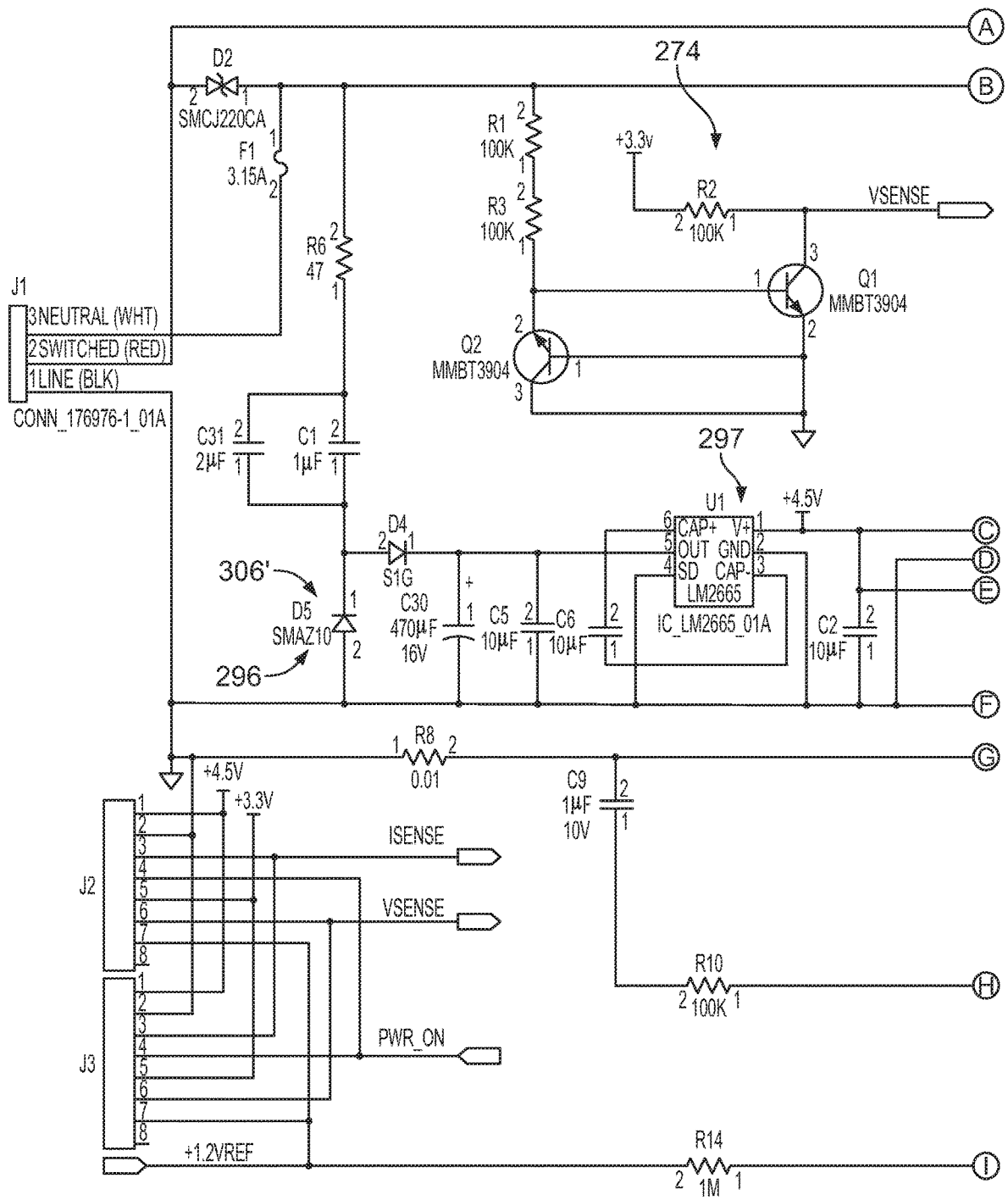
Figure 4B:
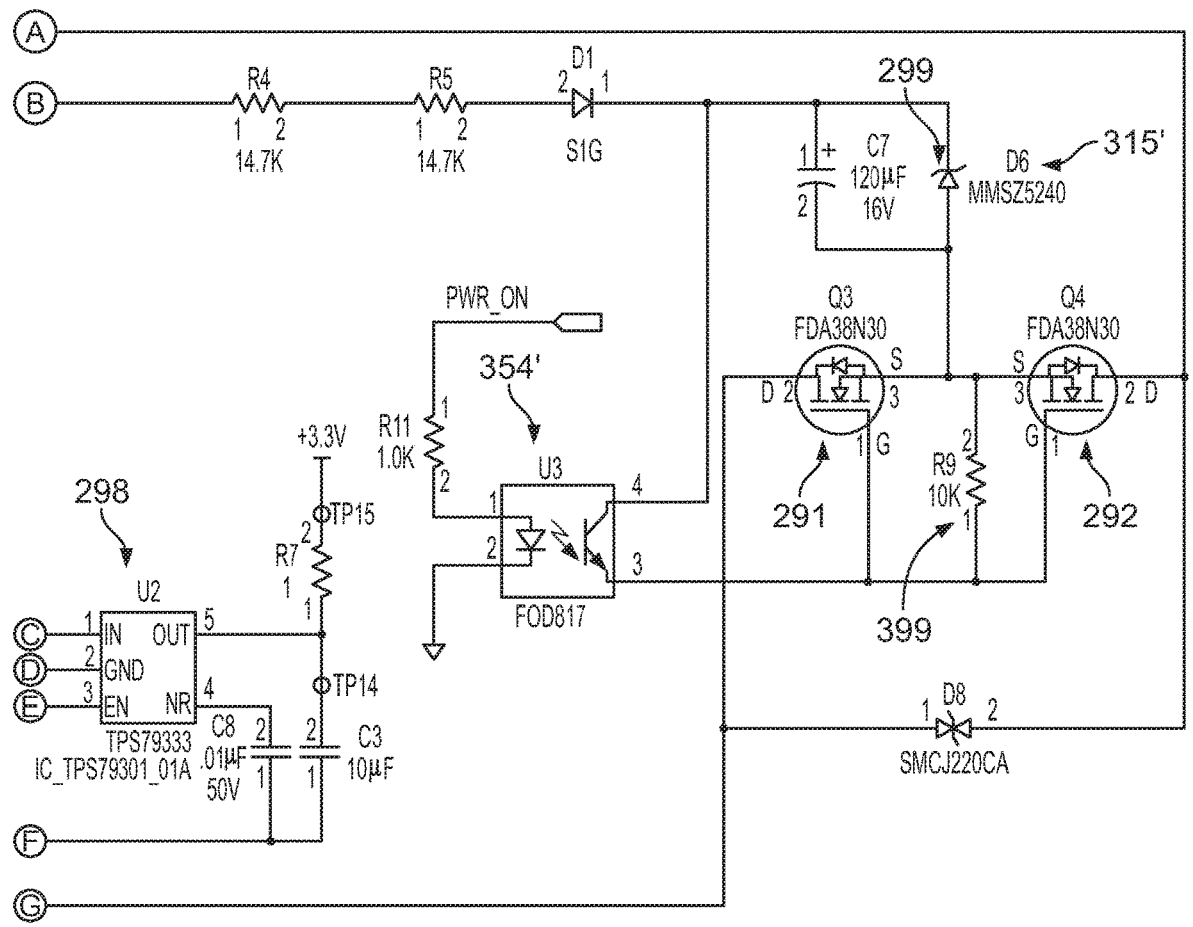
Figure 4B:
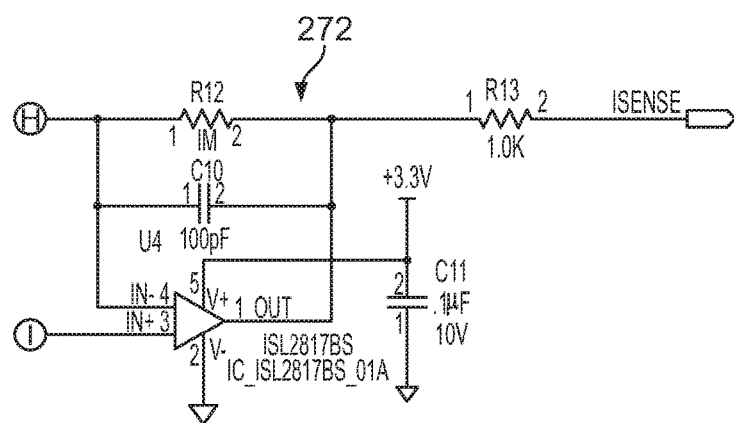

FIG. 4B depicts exemplary power supply circuitry 295', the current sense circuit 272, the voltage sense circuit 274, and the output switches 290' in the form of transistors 291 and 292, the gates of which are driven by a control signal from the microcontroller 205 via the opto-isolator 354'. A resistor 399 is operatively coupled between the gates of the transistors 291 and 292 and their respective sources. The power supply circuitry includes the shunt regulator 296 formed by the zener diode 306', the charge pump 297 and the voltage regulator 298, which generally provide power to various components of the line control module 110'. In addition, the power supply circuitry 295' includes the shunt regulator 299 formed by the zener diode 315', which provides power to the output switches 290'.

Figure 4C:
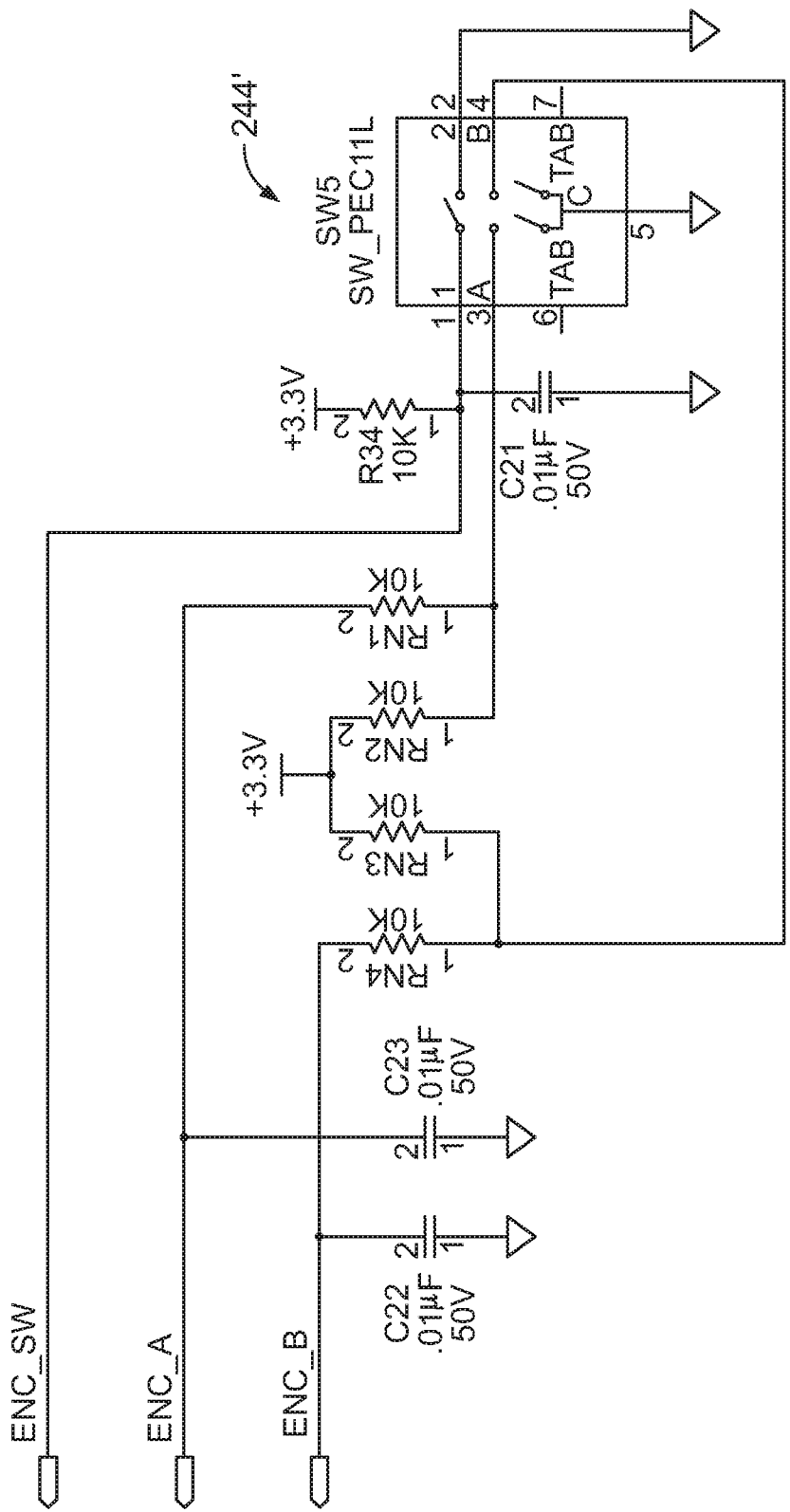

FIG. 4C depicts the exemplary rotary encoder 244' and additional circuitry to facilitate outputting signals (EN_A, EN_B, and EN_SW) to the microcontroller as described herein.

Figure 4D:
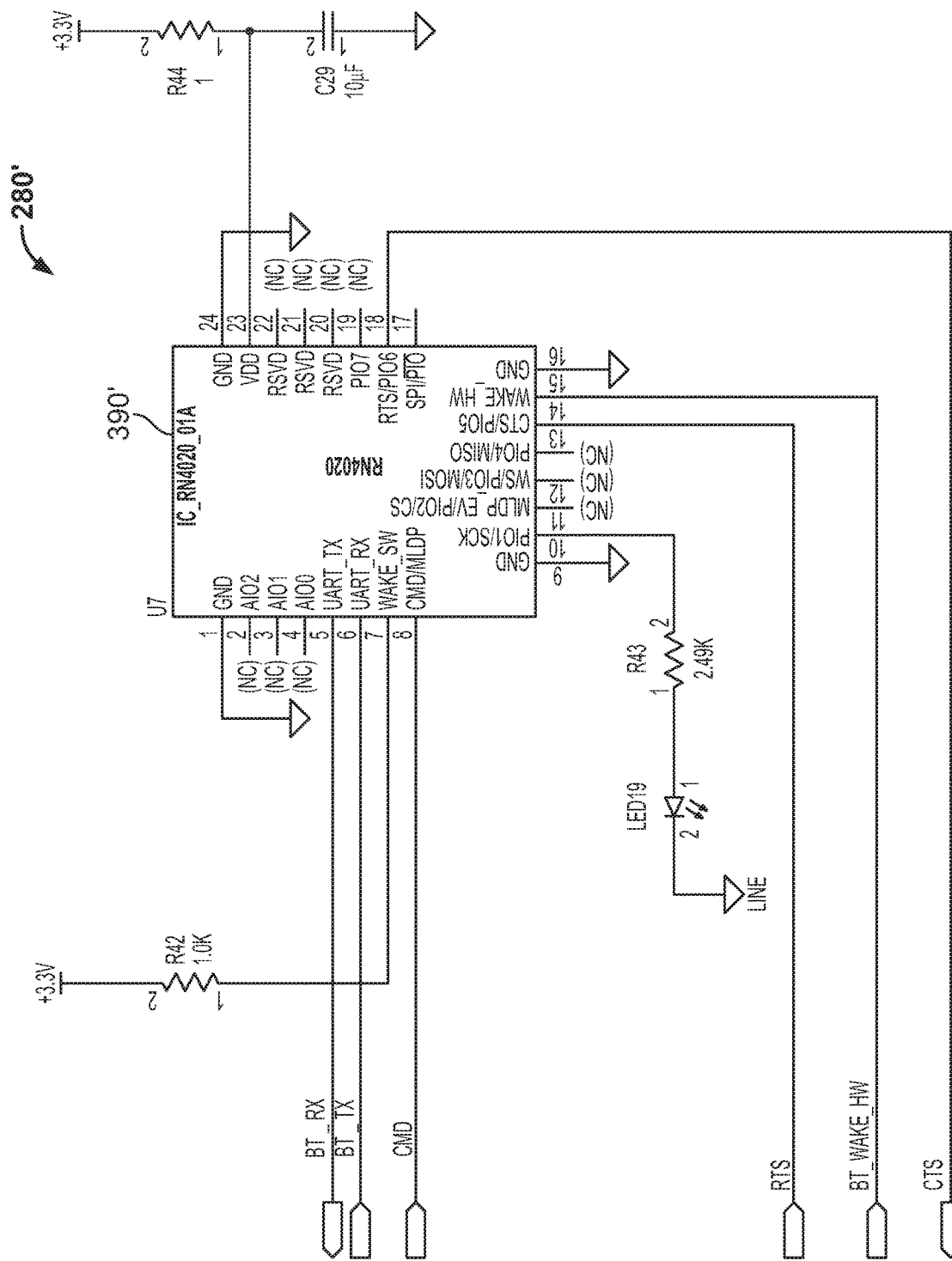

FIG. 4D depicts the wireless transceiver circuitry 280' of an embodiment the line control module 110'. As shown in FIG. 4D, the wireless transceiver circuitry 280' can include a wireless transceiver module 390', such as the RN4020 from Microchip Technology, Inc. In exemplary embodiments, the wireless transceiver module 390' can be operatively coupled to the microcontroller 205 to receive data signals (BT_TX) from the microcontroller 205 for wireless transmission, and can be operatively coupled to the microcontroller 205 to transmit data signals (BT_RX) to the microcontroller 205, which were wirelessly received. For example, the microcontroller 205 can transmit data associated the line control module and/or the lighting system to a wireless device via the wireless transceiver module, and can receive data (including commands or instructions) from the wireless device to control an operation of the line control module and/or the lighting system as described herein. The wireless transceiver module 390 can receive a control signal (BT_WAKE_HW) from the microcontroller 205 to control whether the wireless transceiver module 390 is "awake" or in "sleep" mode as well as a control signal CMD forming commands to be processed by the wireless transceiver. In some embodiments, an output of the wireless transceiver module 390 can be operatively coupled to an LED 392. The LED 392 can be energized to indicate that a wireless device is "paired" with the wireless transceiver module 390 and/or that the wireless device and the line control module are in wireless communication with each other.

Figure 5:
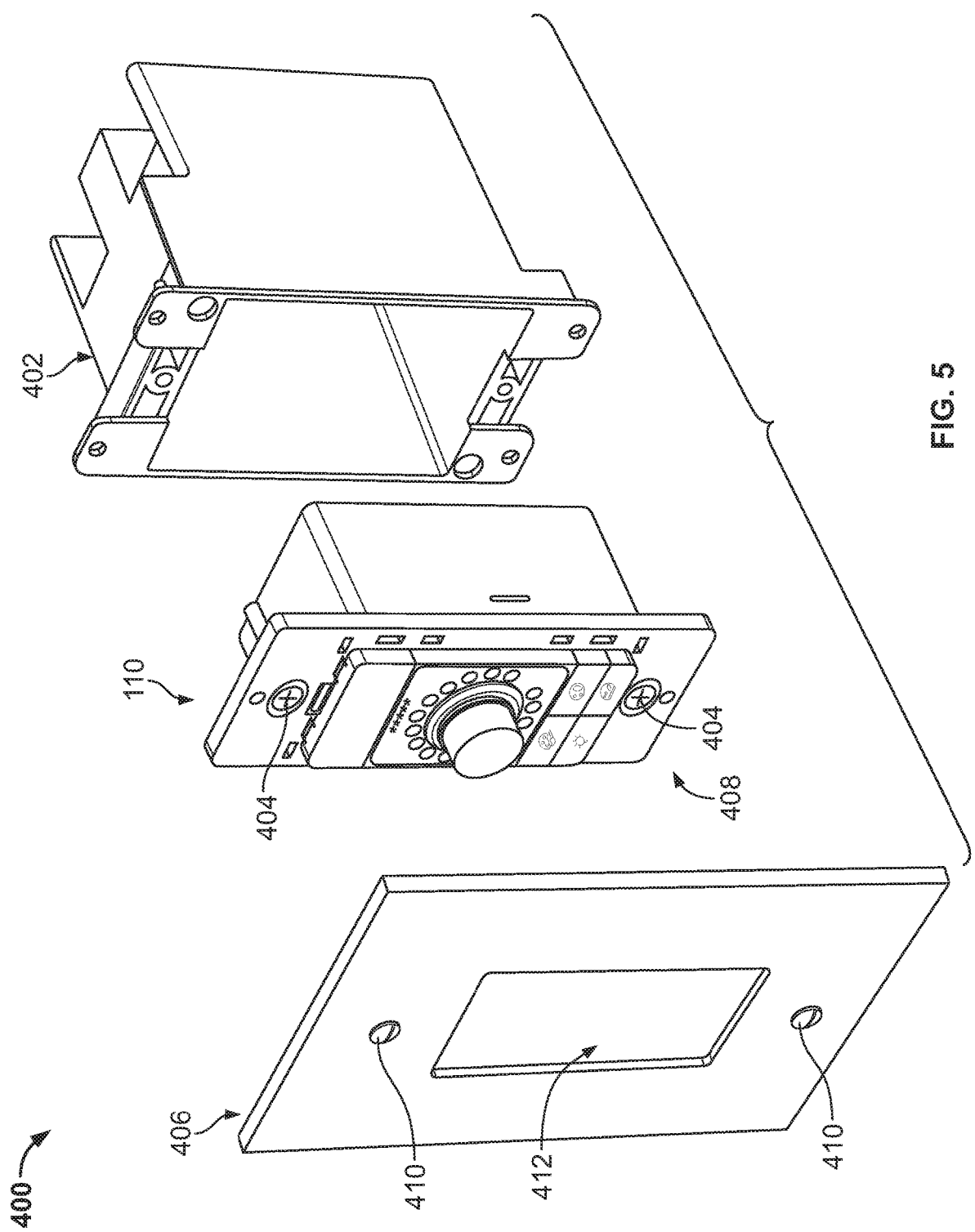
FIG. 5 depicts an exemplary wall mount assembly of a line control module in accordance with exemplary embodiments of the present disclosure.
Figure 6:
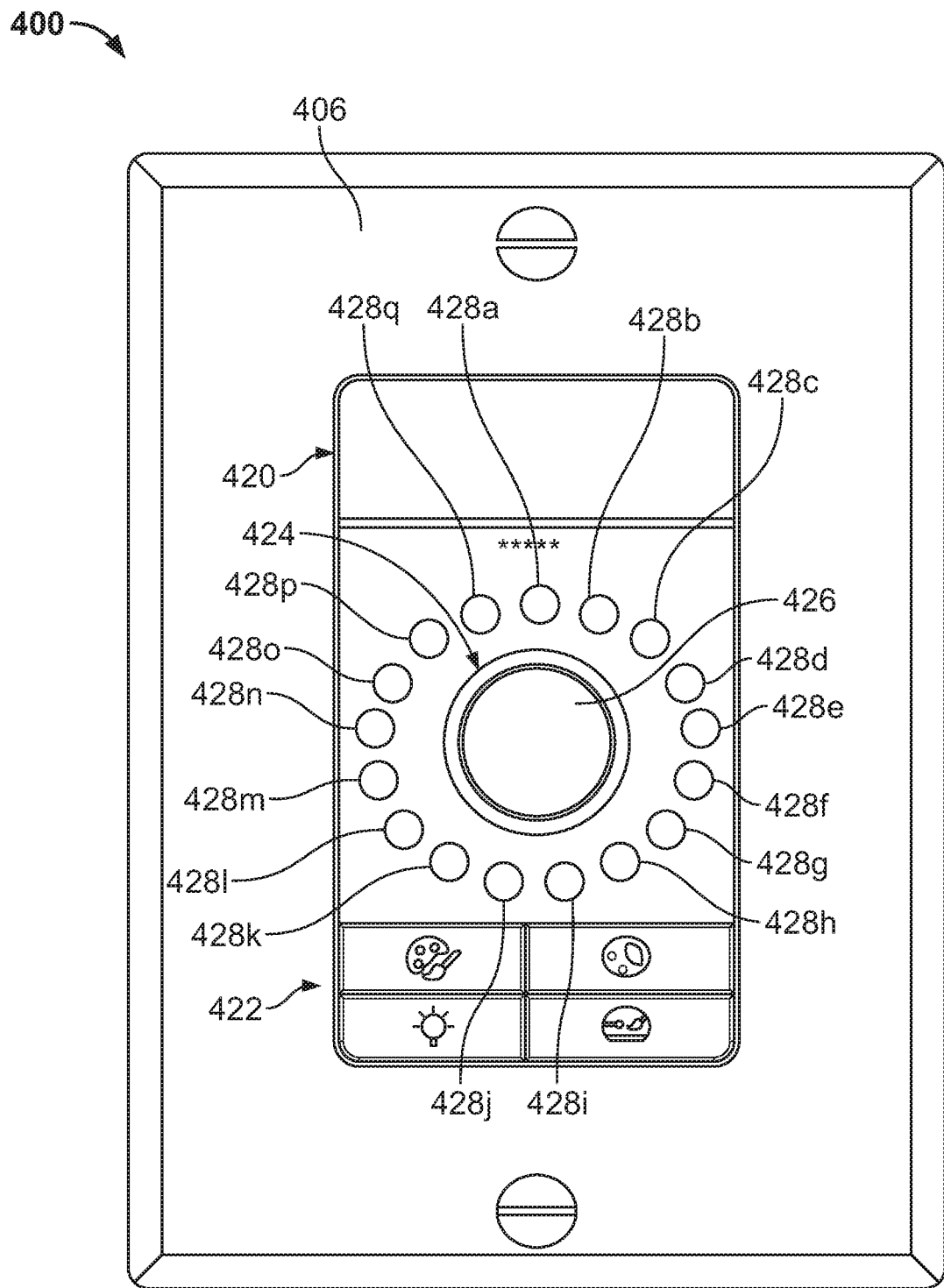
FIG. 6 depicts an exemplary illustration of a face plate of a line control module in accordance with exemplary embodiments of the present disclosure.

FIG. 5 depicts a perspective view of an exemplary illustration of a wall mount assembly 400 including an exemplary embodiment of the line control module 110 in accordance with exemplary embodiments of the present disclosure. FIG. 5 depicts a front view of the wall mount assembly 400 in an assembled form. As shown in FIG. 5, an exemplary embodiment of the line control module 110 can be implemented to be disposed in an electrical box 402 that can be mounted to a wall or other structure (not shown). For example, exemplary embodiments of the line control module 110 can be disposed in a conventional single gang electrical box, a two gang electrical box, a three-gang electrical box, and so on. The line control module 110 can be secured to the electrical box 402 using screws 404. A face plate 406 can be fitted to a front 408 of the line control module 110 and screws 410 can be used to secure the face plate 406 to the line control module 110. As shown in FIGS. 5 and 6, the face plate 406 can include an opening 412 configured to receive at least a portion of the front 408 of the line control module 110 such that a portion of the line control module 110 extends flush with and/or through the opening 412 of the face plate 406 when the wall assembly 400 is in its assembled form.

As shown in FIGS. 5 and 6, the front 408 of the line control module 110 can include a preview window 420, mode selection buttons 422, a rotatable knob 424 with a push button 426, and indicator windows 428*a-q*. The preview window 420 can be positioned over and/or aligned with the RGB LED 254 of the preview circuit 250 (FIGS. 2A and 3E) to allow light being emitted by the LED 254 to be visible through the preview window 420. A user of the line control module 110 can preview and/or simulate light shows that can be output by a lighting system through the preview window 420 via the preview circuit as described herein. The mode selection buttons 422 can be actuated by a user to interact with the mode selection switches 242 (FIGS. 2A and 3C) to control an operation of the light control module 110 and/or the light modules in the lighting system as described herein. The rotatable knob 424 and push button 426 can be operatively coupled to a shaft of the rotary encoder 244 (e.g., FIGS. 2A and 3D), and the knob 424 can be rotated by a user to rotate the shaft of the rotary encoder to control one or more operation parameters of line control module 110 and/or of the light modules in a lighting system operatively coupled to the line control module. The push button 426 can be actuated by a user to allow the user to select one or more parameters or settings specified by the user via rotation of the knob 424 and/or can be actuated to implement one or more operations or functions of the line control module 110 and/or of the light modules in a lighting system operatively coupled to the line control module.

The indicator windows 428*a-q* can be positioned over or aligned with the LEDs 248 of the indicator circuitry (FIGS. 2A and 3F) to allow light being emitted by the LEDs 248 to be visible through the indicator windows 428*a-q* to indicate one or more settings associated with one or more parameters of the line control module; one or more settings associated with one or more parameters of the light modules; and/or to indicate an interaction between a user and the knob 424. In the present embodiment, indicator windows 428*a-q* can be disposed circumferentially about the knob 424. Each of the indicator windows 428*a-q* can correspond to one of the LEDs 248 of the indicator circuitry, and can also correspond to one of the available light shows that can be output by a light modules operatively coupled to the line control module 110.

As described herein, the LEDs 248 can be energized or de-energized to indicate various settings and/or parameters via the indicator windows that are associated with an operation of the line control module 110 and/or the light modules operatively coupled to the line control module. As one example, when a user wishes to preview and/or select a light show to be output by the lighting system, the user can rotate the knob 424 (and therefore the shaft of the rotary encoder to select a light show. As the user rotates the knob 424, the LEDs 248 can be energized and de-energized to correlate a rotation of the knob 424 with illumination of the LEDs 248 to indicate, through one of the indicator windows 428*a-q*, the light show that corresponds to the current rotation of the knob 424. As another example, when the user is adjusting an intensity/brightness or rate of a light show, the user can rotate the knob 424 to change the intensity/brightness, timer/schedule, or the rate. As the user rotates the knob 424, the LEDs 248 can be energized and de-energized to correlate a rotation of the knob 424 with illumination of the LEDs 248 to indicate, through one or more of the indicator windows 428*a-q*, settings associated with the intensity/brightness, timer/schedule, or rate that corresponds to the current rotation of the knob 424.

Figure 7:
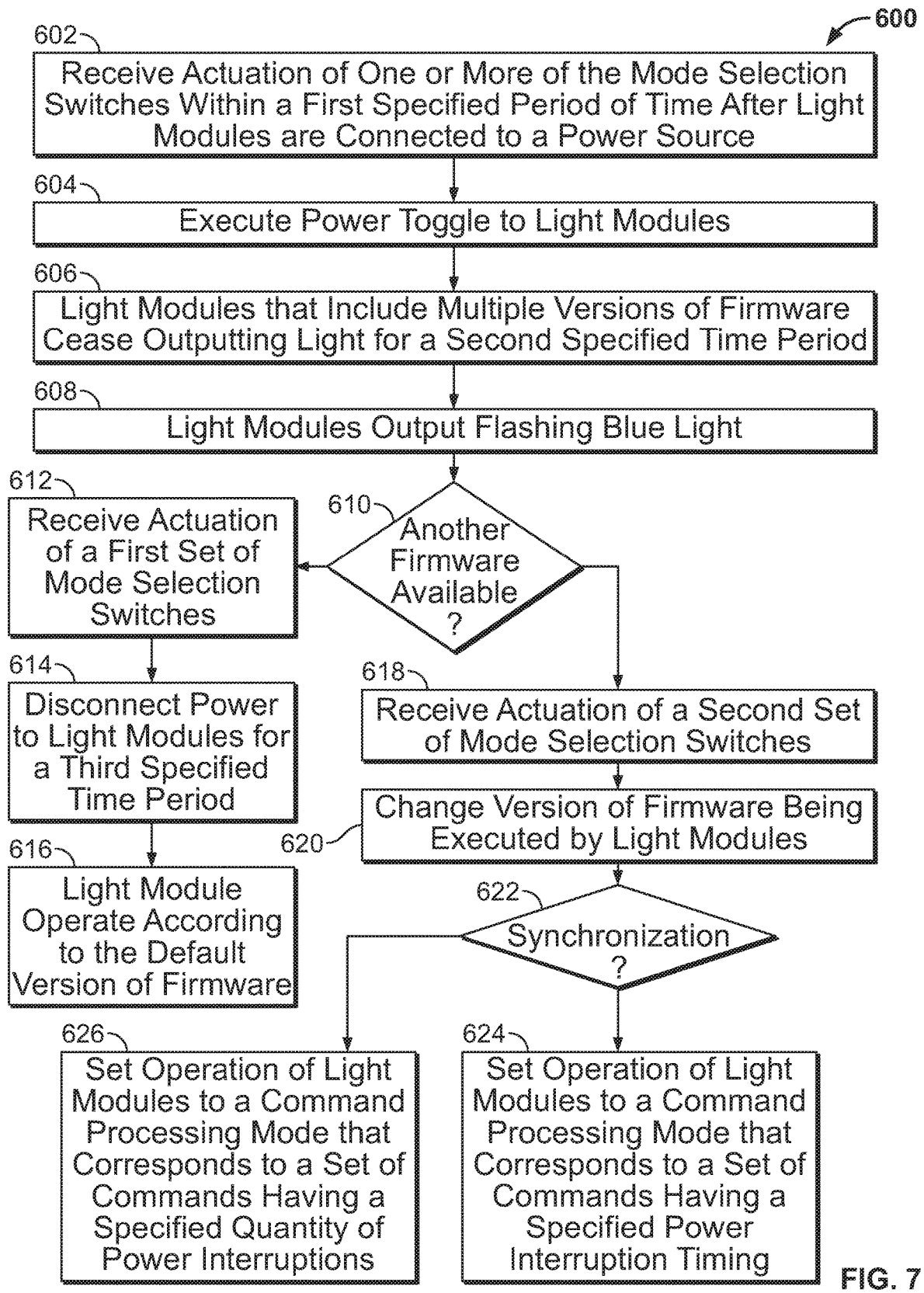
FIG. 7 is a flowchart illustrating an exemplary process for controlling the light modules in the lighting system to switch from executing one version of the firmware to executing another version of the firmware.

FIG. 7 is a flowchart illustrating an exemplary process 600 for controlling the light modules in the lighting system to switch from executing a (default) version of the firmware (e.g., version 160 in FIG. 1) to executing another version of the firmware (e.g., version 162 in FIG. 1). In some embodiments, the version of firmware being executed by the light modules can be switched within a specified time period (e.g., 15 seconds) after being turned on (e.g., after being connected to a power source via the line control module). During this specified period, the light modules can output a white light. A user can test whether any of the light modules include multiple versions of firmware. For example, at step 602, the user can actuate one or more of the mode selection switches of the line control module (e.g., pressing the brightness and light show selection buttons simultaneously), which, at step 604, can cause the line control module to execute a power toggle sequence, shown in FIG. 8.

When the light modules receive this command, any of the light modules that include another version of firmware will go dark (e.g., cease outputting light) for approximately one second at 606, then begin to flash blue at step 608. Light modules that do not include another version of the firmware will not flash blue upon receiving this command. The user can determine if any of the light modules do not include another version of the firmware by observing which, if any, light modules are not flashing blue in response to the command. In some embodiments, if any of the light modules do not include another version of firmware, all of the light modules in the system continue to be operated using the default version of firmware even if some of the light modules include another version of firmware. If any light modules do not include another version of firmware (step 610), the user can press a first set of the modes selection switches at step 614. This will cause the light modules to turn off for 30 seconds at step 616 (e.g., in response to a power disconnect). When power returns, all light modules will operate according to the default version of firmware at step 618. If all of the light modules are include another version of the firmware (step 610), the user can actuate a second set of the mode selection switches then to change the version of firmware being executed by the light modules at step 620.

If the line control module is capable of synchronous power line control (step 622), at step 624, the line control module sends a mode command to the light modules in the form of a single power toggle of approximately 250 milliseconds to set the operation of the light modules to a command processing mode that corresponds to a set of commands having a specified power interruption timing. For example, the mode command received by the light modules can set an operation of the light modules to the command processing mode 166 provided by the firmware 162 (FIG. 1), which can correspond to the set of commands 224 of the power interruption mode 220 (FIG. 2A). If the line control module is not capable of synchronous control (step 622), at step 626, the line control module sends a different mode command to the light modules in the form of a single power toggle of approximately 450 milliseconds to set the operation of the light modules to a command processing mode that corresponds to a set of commands having a specified quantity power interruptions. For example, the longer mode command received by the light modules can set an operation of the light modules to the command processing mode 164 provided by the firmware 162 (FIG. 1), which can correspond to the set of commands 222 of the power interruption mode 220 (FIG. 2A).

Figure 8:
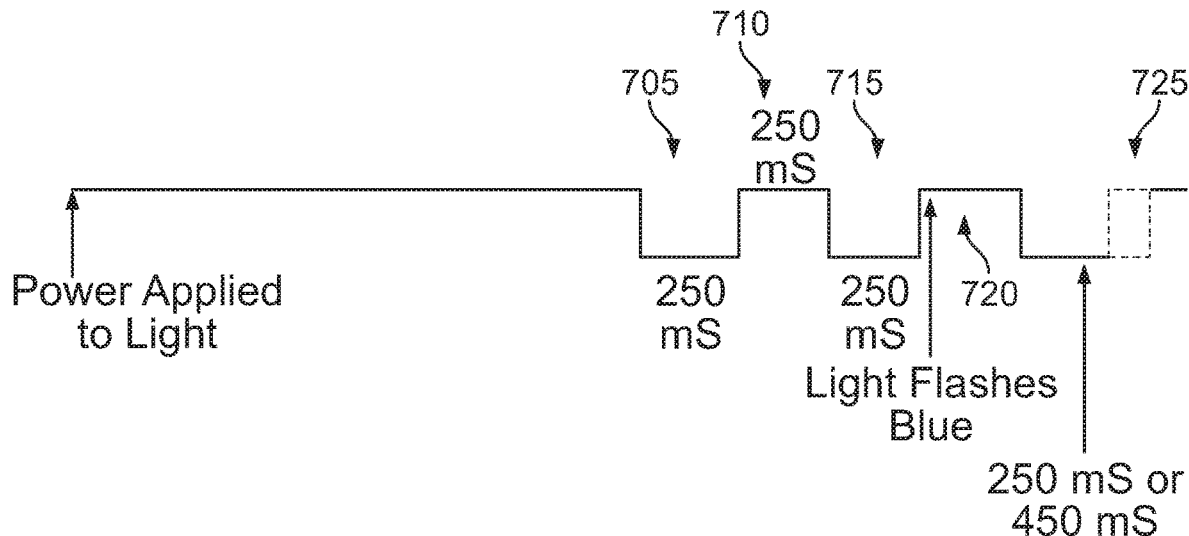
FIG. 8 depicts an exemplary power cycling sequence generated by an embodiment of the line control module to control the light modules in the lighting system to switch from executing one version of the firmware to executing another version of the firmware.

As shown in FIG. 8, an exemplary power toggle sequence to change versions of firmware includes an "OFF" period 705 for approximately 250 milliseconds (e.g., disconnect the power), an "ON" period 710 for approximately 250 milliseconds (e.g., connect the power), an "OFF" period 715 for approximately 250 milliseconds, and then "ON" (denoted by 720) until another command is issued by the line control module 110 or the power to the light modules is disconnected to turn the light modules off. An additional power toggle 725 having one of two "off" time periods (e.g., approximately 250 milliseconds or approximately 450 milliseconds) can follow the reconnection of power if the line control mode is configured to specify which power interruption and command processing modes will be used to issue commands from the line control module to the light modules.

Figure 9:
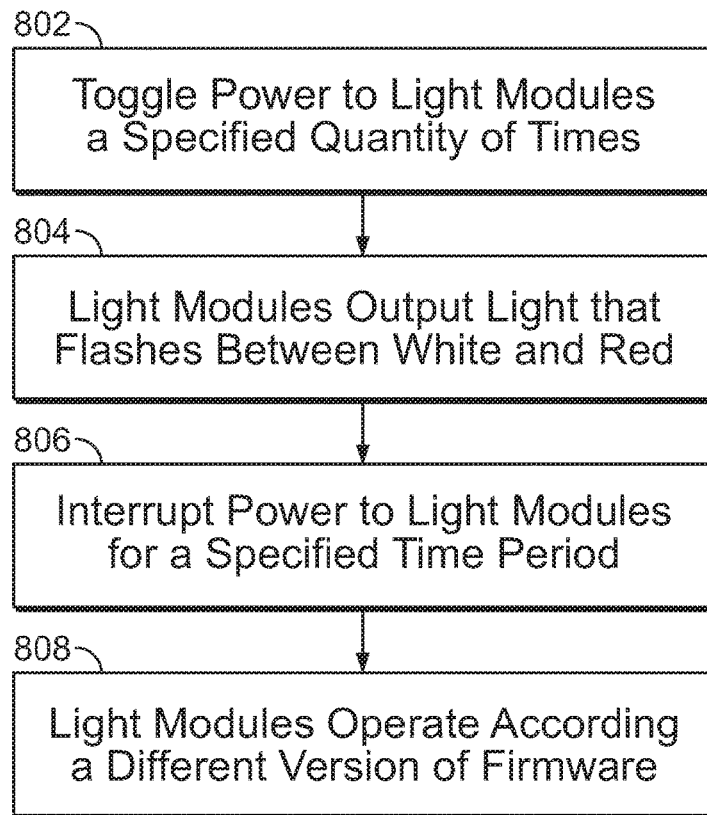
FIG. 9 is a flowchart illustrating another exemplary process for controlling the light modules in the lighting system to switch from executing one version of the firmware to executing another version of the firmware.

FIG. 9 is a flowchart illustrating another exemplary process 800 for controlling the light modules in the lighting system to switch from executing one version of the firmware (e.g., version 162 in FIG. 1) to executing a different (default) version of the firmware (e.g., version 160 in FIG. 1). At step 802, while a light show is running, power to the light modules is toggled a specified quantity of times (e.g., three times) by the line control module, and the duration of the power interruption of each power toggle lasts for a specified time period (e.g., eleven seconds). At step 804, after the final power toggle, the light modules flash between white and red. At step 806, power to the light modules is interrupted by the line control module to turn the light modules off for a specified time period (e.g., thirty seconds). At step 808, when power is reconnected to the light modules after the specified time period, the light modules operate according the different version of firmware.

Figure 10:
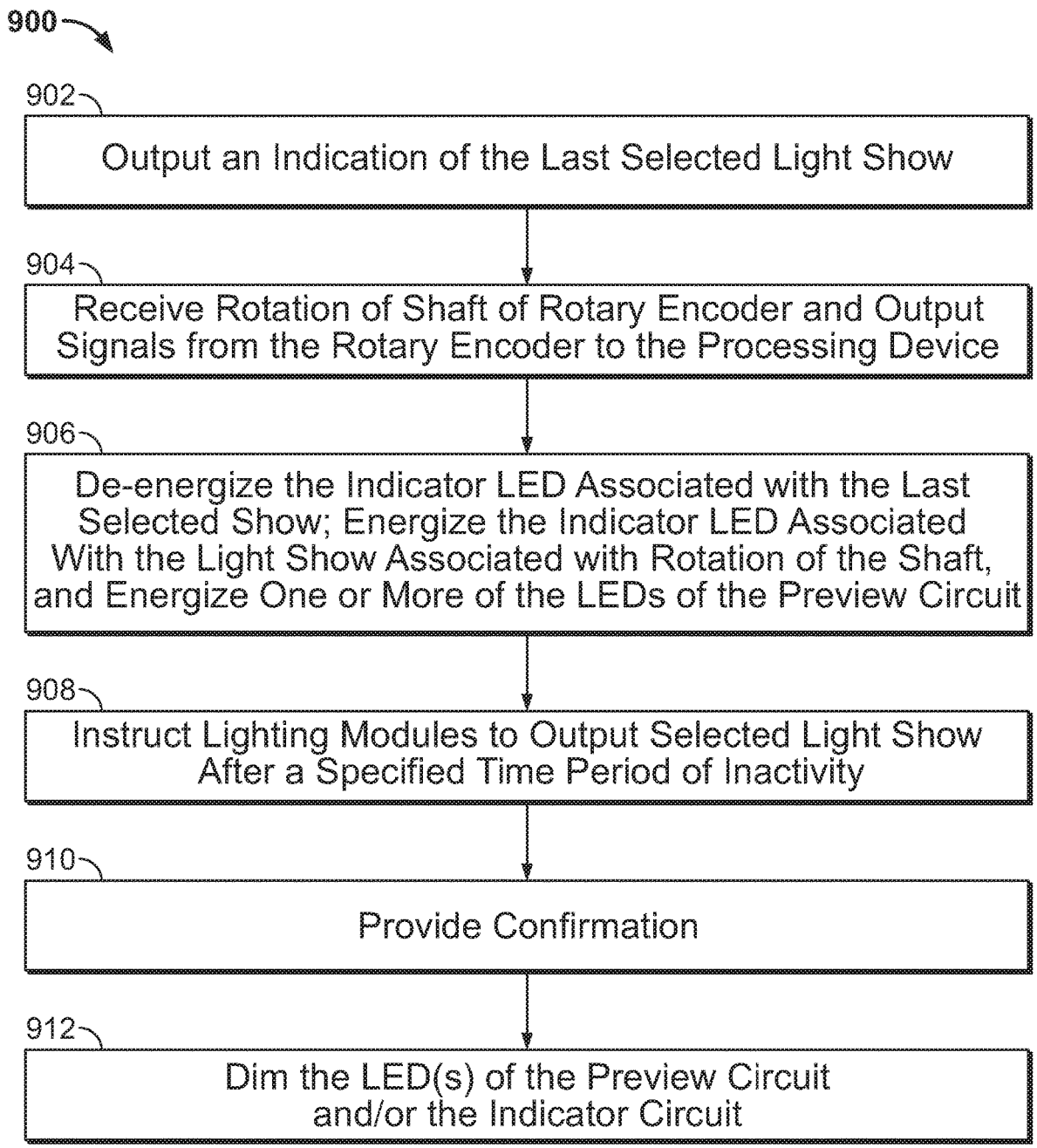
FIG. 10 is a flowchart illustrating an exemplary process for selecting, via a user interface of an exemplary embodiment of a line control module, a light show to be output by light modules in a lighting system.

FIG. 10 is a flowchart illustrating an exemplary process 900 for selecting, via the user interface of an exemplary embodiment of the line control module 110, a light show to be output by light modules in a lighting system. At step 902, the processing device of the line control module controls the user interface to output an indication of the current or the last selected light show by illuminating the corresponding indicator LED and/or by outputting a preview of the current light show via the preview circuit. At step 904, in response to a rotation of the shaft of the rotary encoder, the rotary encoder can output electrical signals to the processing device. At step 906, the processing device of the line control module can execute the firmware to control the indicator LEDs to de-energize the indicator LED associated with the last selected show, energize the indicator LED associated with the light show corresponding to the rotation of the shaft of the rotary encoder, and energize one or more of the LEDs of the preview circuit to output a preview of the light show associated with the degree to which the shaft of the rotary encoder is rotated. At step 908, after a specified time period has passed without further rotation of the shaft, the processing device of the line control module controls an operation of the output switches to issue commands to the light modules, in the form of one or more power toggles as described herein, instructing the light modules to output the selected light show. At step 910, the indicator LED associated with the selected light show can be controlled by the processing device of the line control module to flash/blink a specified number of times to provide confirmation that the line control module issued a command to the light modules to output the selected light show, and at step 912, the processing device of the line control module controls the user interface to dim the LED(s) of the preview circuit and/or the indicator circuit.

Figure 11:
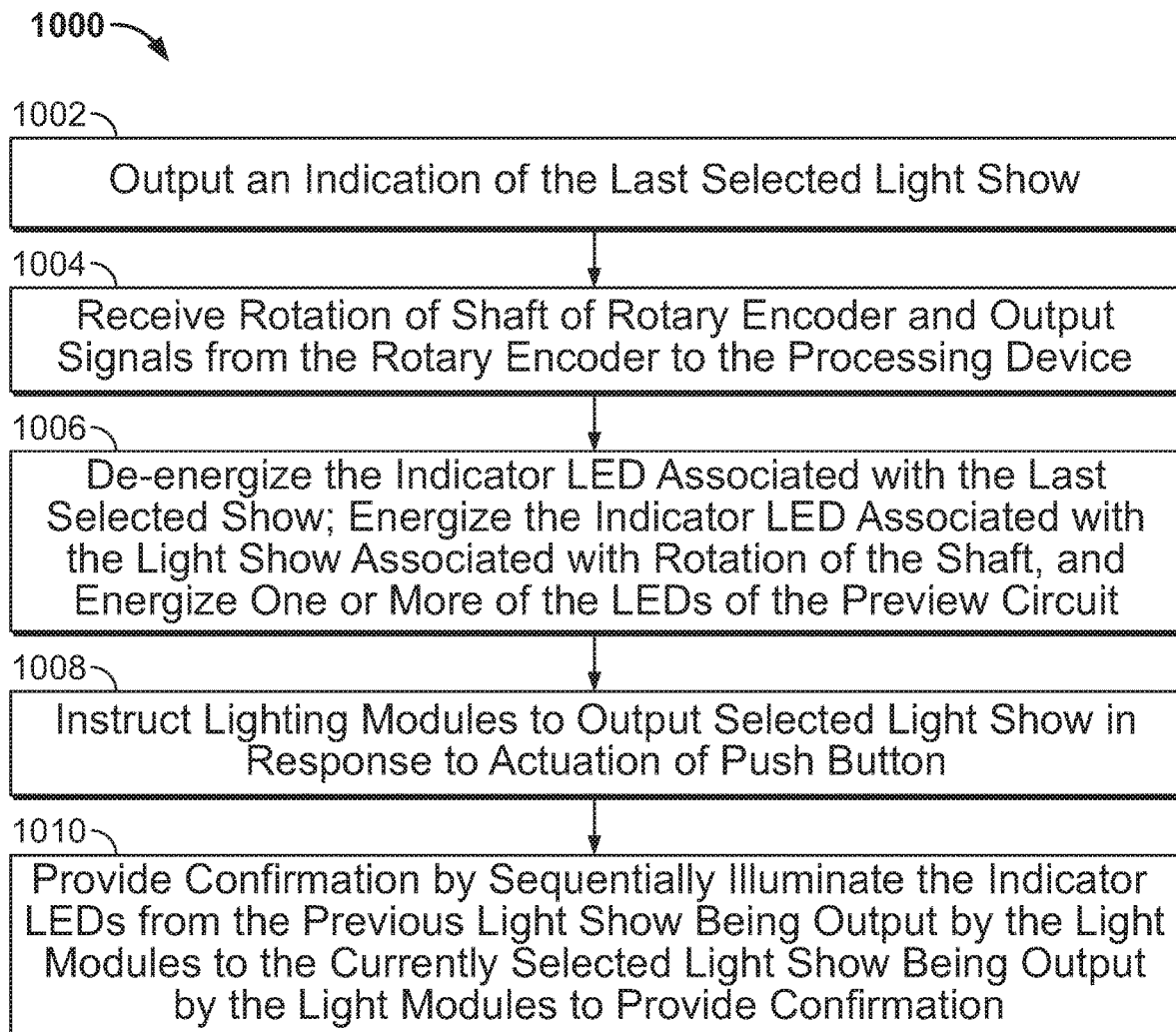
FIG. 11 is a flowchart illustrating another exemplary process for selecting, via the user interface of an exemplary embodiment of a line control module, a light show to be output by light modules in a lighting system.

FIG. 11 is a flowchart illustrating an exemplary process 1000 for selecting, via the user interface of an exemplary embodiment of the line control module 110, a light show to be output by light modules in a lighting system. At step 1002, the processing device of the line control module controls the user interface to output an indication of the current or the last selected light show by illuminating the corresponding indicator LED and/or by outputting a preview of the current light show via the preview circuit. At step 1004, in response to a rotation of the shaft of the rotary encoder, the rotary encoder can output electrical signals to the processing device. At step 1006, the processing device of the line control module can execute the firmware to control the indicator LEDs to de-energize the indicator LED associated with the last selected show, energize the indicator LED associated with the light show corresponding to the rotation of the shaft of the rotary encoder, and energize one or more of the LEDs of the preview circuit to output a preview of the light show associated with the degree to which the shaft of the rotary encoder is rotated. At step 1008, in response to an actuation of the pushbutton of the rotary encoder by the user, the processing device of the line control module controls an operation of the output switches to issue commands to the light modules, in the form of one or more power toggles as described herein, instructing the light modules to output a selected light show. At step 1010, the processing device of line control module controls the indicator circuit to sequentially illuminate the indicator LEDs from the previous light show being output by the light modules to the currently selected light show being output by the light modules to provide confirmation that the line control module issued a command to the light modules to transition from outputting the last light show to outputting the currently selected light show.

Figure 12:
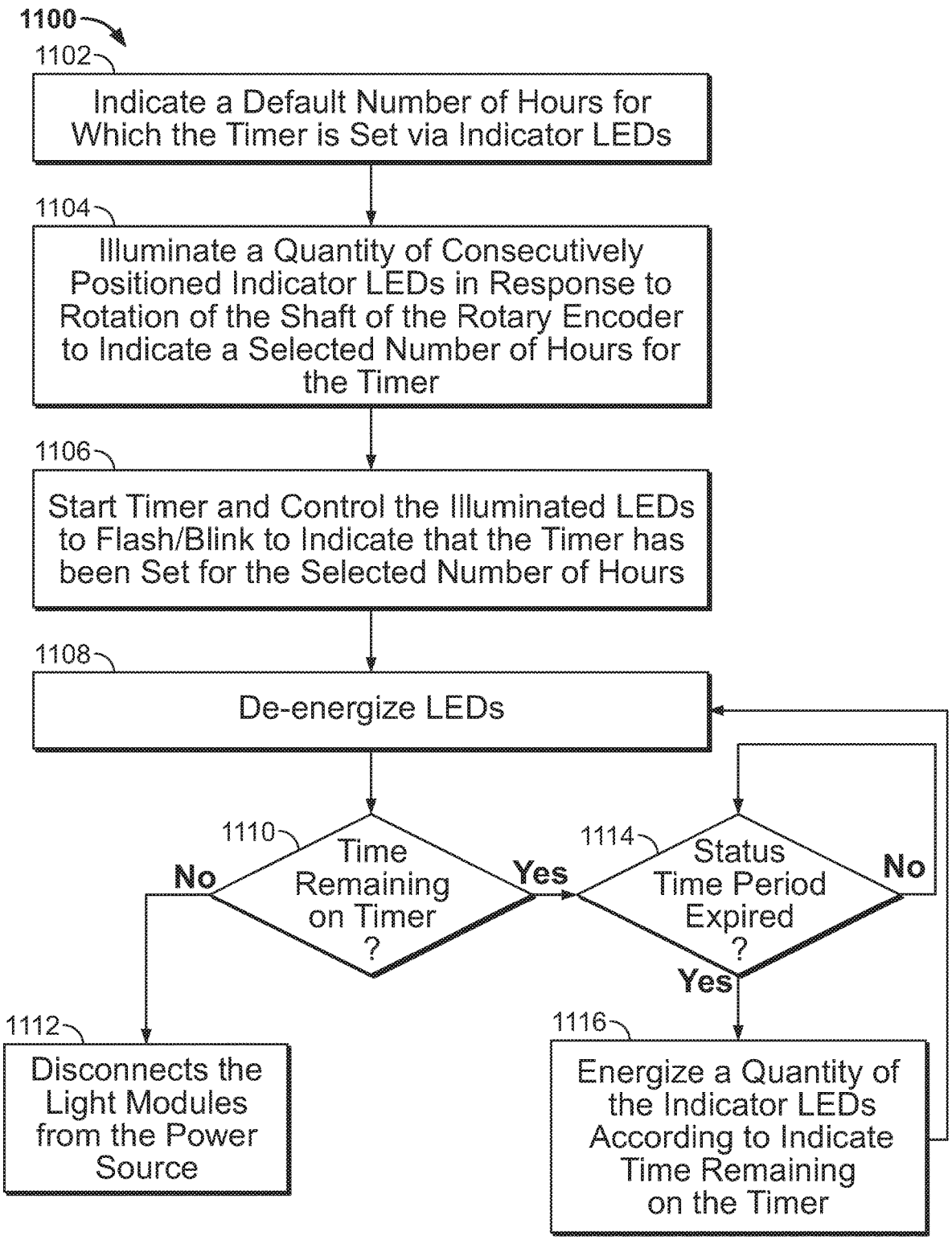
FIG. 12 is a flowchart illustrating an exemplary process for setting a timer of a line control module to control when the light modules output a selected light show.

FIG. 12 is a flowchart illustrating an exemplary process 1100 for setting a timer to control when the light modules output a selected light show. At step 1102, in response to a selection of the timer selection button by a user, the processing device of the line control module can execute the firmware to illuminate a default number of indicator LEDs to indicate a number of hours for which the timer is set. For example, in the present example, the processing device can execute the firmware to energize two adjacent indicator LEDs to indicate that the timer time period of two hours. The user can then rotate the shaft of the rotary encoder until a desired length of time is reached for the timer. At step 1104, in response to a rotation of the shaft of the rotary encoder to the desired length of the timer, the processing device of the line control module can illuminate a quantity of consecutively positioned indicator LEDs (e.g., disposed in a circular arrangement) to indicate the number of hours selected by the user. At step 1106, after a specified time period and/or in response to an actuation of the mode selection switch associated with the timer function (e.g., the timer selection switch), the processing device of the line control module can start the timer and can control the illuminated LEDs to flash/blink to indicate that the timer has been set for the selected number of hours. At step 1108, the indicator LEDs that were illuminated to indicate the number of hours for which the timer is set are de-energized. At step 1110, the line control module determines whether any time remains on the timer. If not, the processing device of the line control module disconnects the light modules from the power source to turn the light modules off at step 1112 and the process terminates. Otherwise, the processing device of the line control module determines whether a specified status time period has expired. If not, the line control module will wait at step 1114 for the specified status time period to expire. Once the status time period expires (step 1114), at step 1116, the processing device of the line control module energizes a quantity of the indicator LEDs according to indicate the time remaining on the timer to the nearest hour and the process repeats from step 1108. For example, if the user set the timer to six hours and five hours remain, the line control module can illuminate five indicator LEDs. At any time during the process 1100, the user can actuate the mode selection button associated with the timer to reset the timer to its default value (e.g., a default number of hours).

Figure 13:
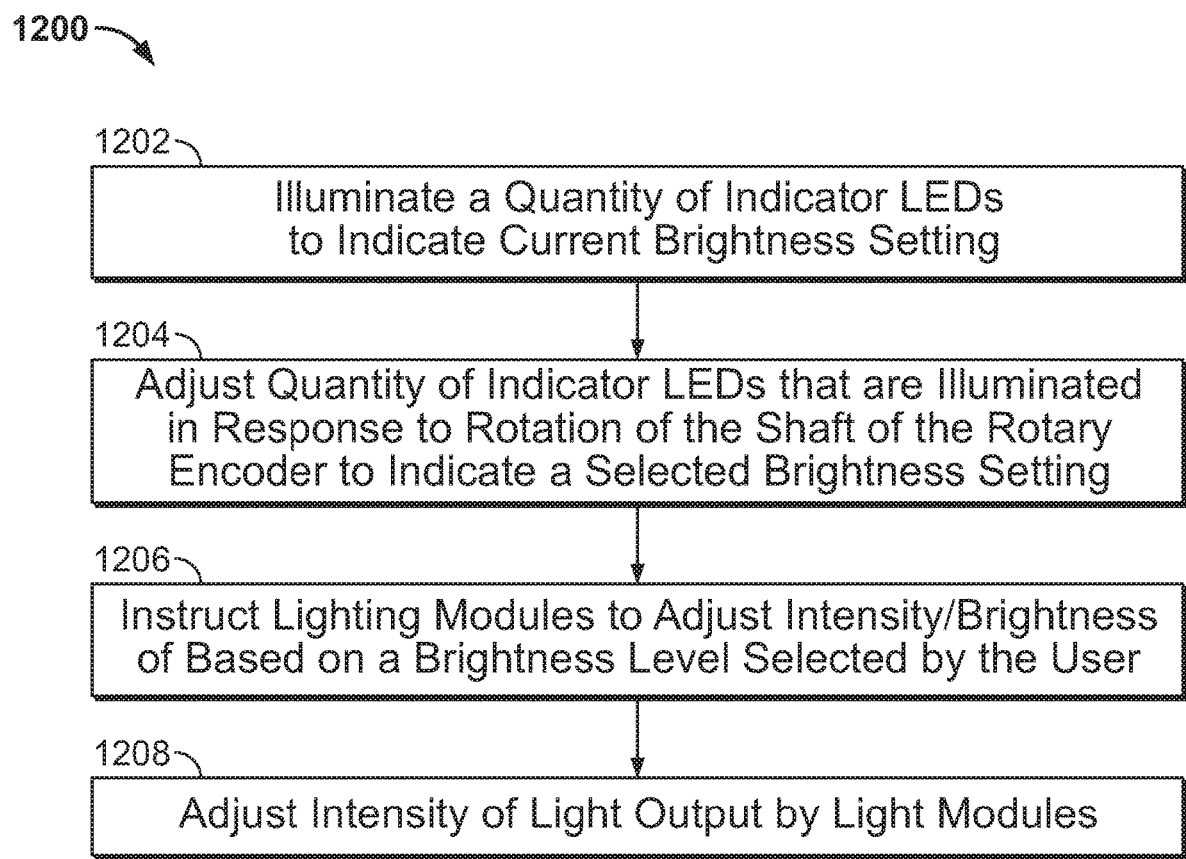
FIG. 13 is a flowchart illustrating an exemplary process for dimming an output of light modules in a lighting system in response to an interaction between a user and a user interface associated with an exemplary embodiment of the line control module.

FIG. 13 is a flowchart illustrating an exemplary process 1200 for dimming the output of the light modules in the lighting system in response to an interaction between a user and the user interface of an exemplary embodiment of the line control module. At step 1202, the line control module illuminates a quantity of indicator LEDs in response to an actuation of the mode selection switch associated with the brightness setting of the light modules (e.g., the brightness selection switch). For example, all of the indicator LEDs can be illuminated to indicate that the brightness of the light modules is currently set to a maximum brightness. In response to a rotation of the shaft of the rotary encoder, the processing device of the line control module can control the quantity of indicator LEDs that are illuminated (e.g., increase/decrease the quantity of indicator LEDs that are illuminated) to indicate an adjustment to the brightness of the output of the light modules at step 1204. As one example, the user can rotate the shaft of the rotary encoder in a counterclockwise direction to decrease a quantity of indicator LEDs are illuminated and to correspondingly decrease the intensity/brightness (dim) of the output of the light modules. As another example, the user can rotate the shaft in a clockwise direction to increase a quantity of indicator LEDs are illuminated and to correspondingly increase the intensity/brightness of the output of the light modules. At step 1206, the processing device of the line control module controls an operation of the output switches to issue commands to the light modules, in the form of one or more power toggles as described herein, instructing the light modules to adjust the intensity/brightness of their outputs based on a brightness level selected by the user. At step 1208, the light modules receive and process the commands and adjust the drive signals to the LEDs to adjust an intensity of light output by the LEDs of the light module.

Figure 14:
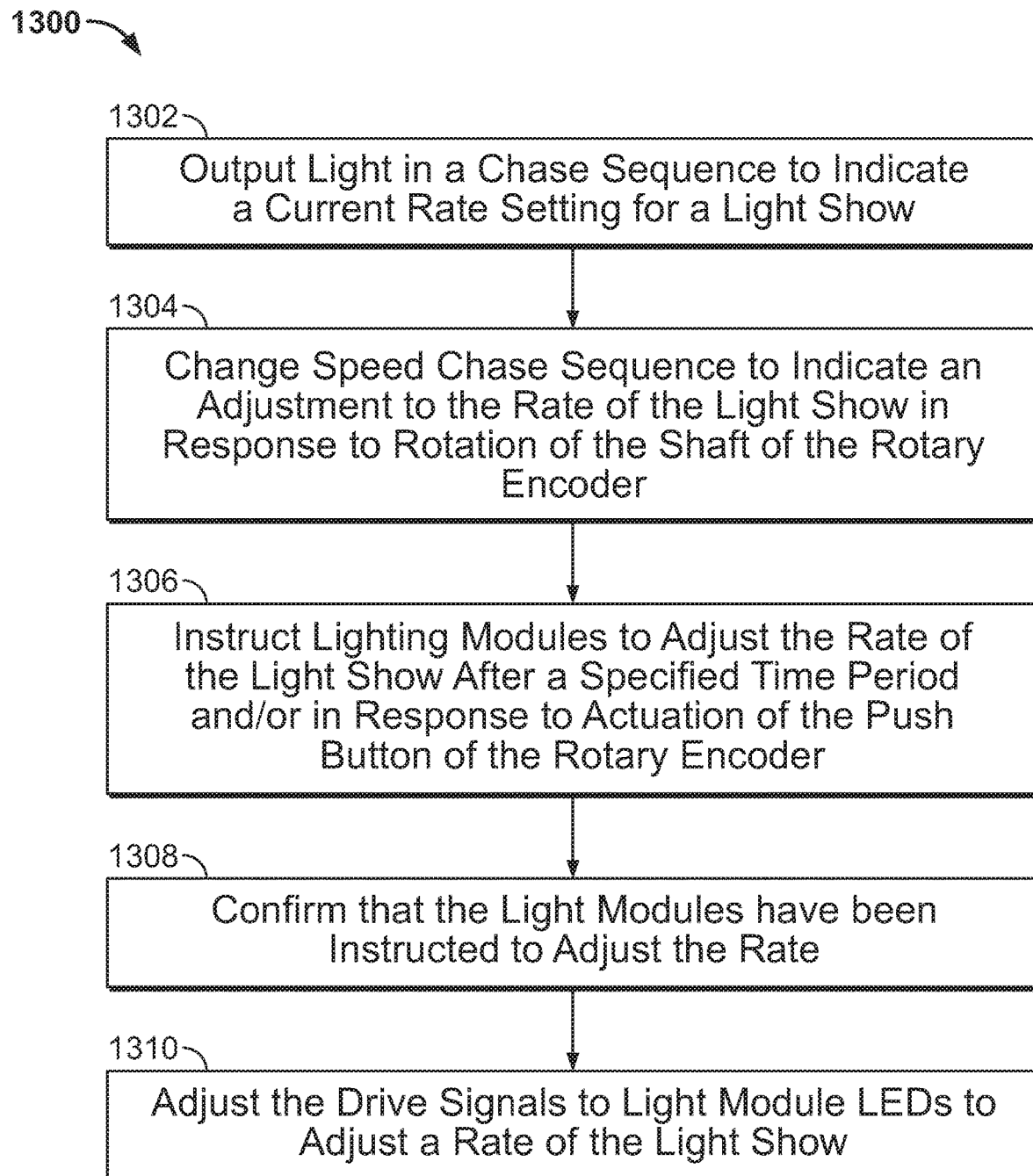
FIG. 14 is a flowchart illustrating an exemplary process for selecting a rate of a light show being output by light modules in a lighting system in response to an interaction between a user and a user interface associated with an exemplary embodiment of a line control module.

FIG. 14 is a flowchart illustrating an exemplary process 1300 for selecting a rate of a light show being output by the light modules in the lighting system in response to an interaction between a user and the user interface of an exemplary embodiment of the line control module. At step 1302, the line control module controls the indicator LEDs to output light in a chase sequence to indicate a current rate setting for the light show being output by the light modules. At step 1304, in response to a rotation of the shaft of the rotary encoder, the processing device of the line control module increases or decreases the speed of the chase sequence to indicate an adjustment to the rate of the light show output by the light modules. As one example, the user can rotate the shaft of the rotary encoder in a counterclockwise direction to decrease the speed of the chase sequence and correspondingly to decrease the rate of the light show output by the light modules. As another example, the user can rotate the shaft of the rotary encoder in a clockwise direction to increase the speed of the chase sequence and to correspondingly decrease the rate of the light show output by the light modules. At step 1306, after a specified time period and/or in response to an actuation of the mode selection switch associated with the rate function (e.g., the rate selection switch), the processing device of the line control module controls an operation of the output switches to issue commands to the light modules, in the form of one or more power toggles as described herein, instructing the light modules to adjust the rate of the light show being output by the light modules. At step 1308, the processing device of the line control module controls the indicator LEDs to flash/blink to confirm that the light modules have been instructed to adjust the rate of the light show being output by the light modules. At step 1310, the light modules receive and process the commands and adjust the drive signals to the LEDs to adjust a rate of the light show being output by the LEDs of the light module.

Figure 15:
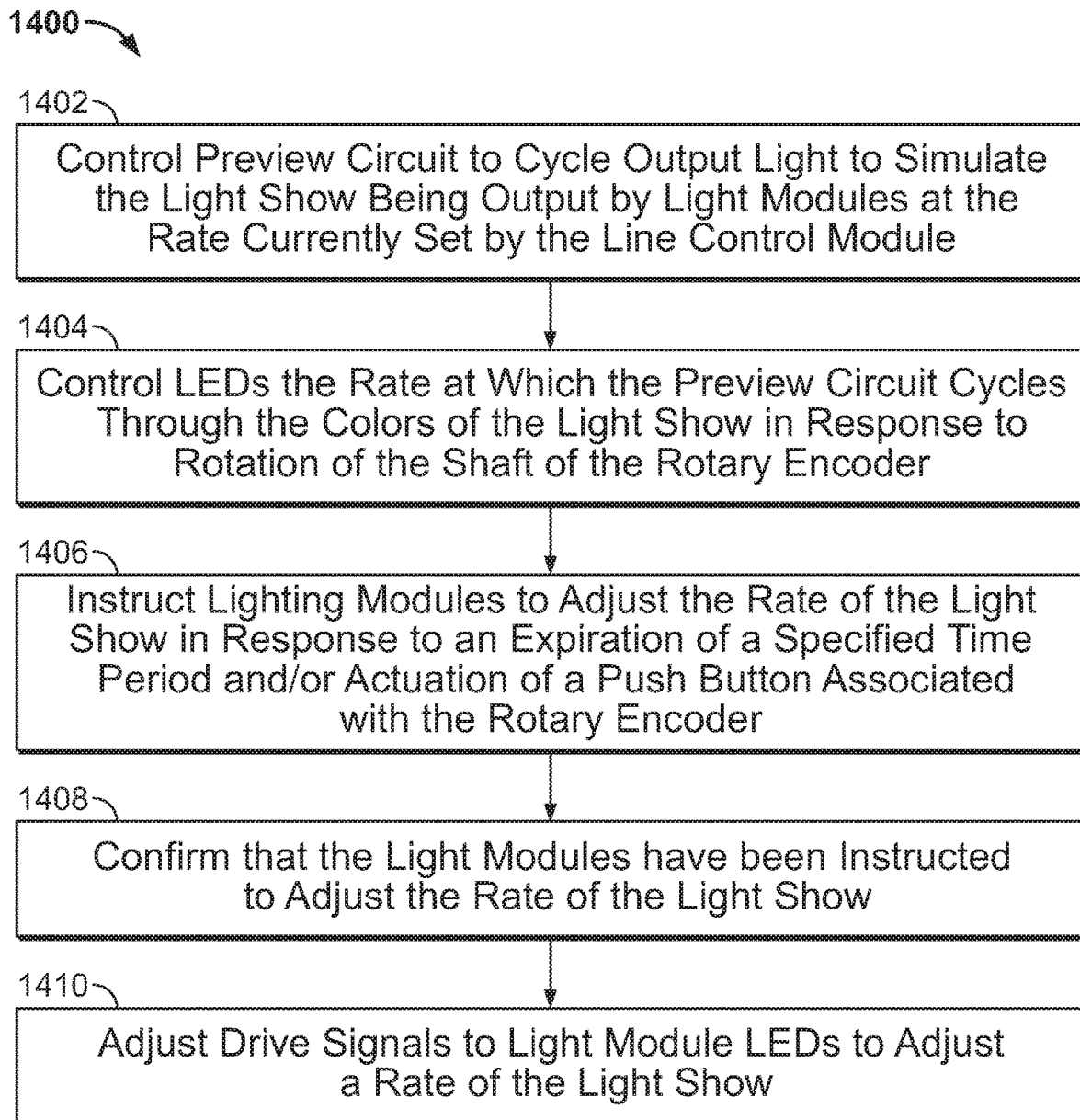
FIG. 15 is a flowchart illustrating another exemplary process for selecting a rate of a light show being output by light modules in a lighting system in response to an interaction between a user and a user interface associated with an exemplary embodiment of the line control module.

FIG. 15 is a flowchart illustrating another exemplary process 1400 for selecting a rate of a light show being output by the light modules in the lighting system in response to an interaction between a user and the user interface of an exemplary embodiment of the line control module. At step 1402, the line control module controls the preview circuit to cycle the output light to simulate the light show being output by the light modules at the rate currently set by the line control module. At step 1404, in response to a rotation of the shaft of the rotary encoder, the processing device of the line control module controls the LEDs of the preview circuit to increase or decrease the rate at which the preview circuit cycles through the colors of the light show to indicate an adjustment to the rate. As one example, the user can rotate the shaft of the rotary encoder in a counterclockwise direction to decrease the rate at which the preview circuit cycles through the colors of the light and to corresponding decrease the rate of the light show output by the light modules. As another example, the user can rotate the shaft of the rotary encoder in a clockwise direction to increase the rate at which the preview circuit cycles through the colors of the light show and to correspondingly increase the rate of the light show output by the light modules. At step 1406, after a specified time period and/or in response to an actuation of the mode selection switch associated with the rate function (e.g., the rate selection switch), the processing device of the line control module controls an operation of the output switches to issue commands to the light modules, in the form of one or more power toggles as described herein, instructing the light modules to adjust the rate of the light show being output by the light modules. At step 1408, the processing device of the line control module controls the indicator LEDs to flash/blink to confirm that the light modules have been instructed to adjust the rate of the light show being output by the light modules. At step 1410, the light modules receive and process the commands and adjust the drive signals to the LEDs to adjust a rate of the light show being output by the LEDs of the light module.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes a plurality of system elements, device components or method steps, those elements, components or steps may be replaced with a single element, component or step. Likewise, a single element, component or step may be replaced with a plurality of elements, components or steps that serve the same purpose. Moreover, while example embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Example flowcharts are provided herein for illustrative purposes and are non-limiting examples of methods. One of ordinary skill in the art will recognize that example methods may include more or fewer steps than those illustrated in the example flowcharts, and that the steps in the example flowcharts may be performed in a different order than the order shown in the illustrative flowcharts.

The invention claimed is:

1. A line control module for controlling operation of an underwater light, comprising:
   a memory storing a plurality of sets of commands;
   a processor in communication with the memory, the processor configured to select one of the plurality of sets of commands to be utilized for controlling an underwater light based on whether the line control module is configured to issue the commands in synchronization with line voltage; and
   one or more output switches controlled by the processor and configured to interrupt transmission of line voltage to the underwater light for specified time periods in response to user inputs received by the processor to thereby control the underwater light.

2. The line control module of claim 1, in combination with the underwater light.

3. The combination of claim 2, wherein the underwater light is configured to execute a first command processing mode and a second command processing mode, wherein the first command processing mode is responsive to power interruption having a first duration and the second command processing mode is responsive to power interruption having a second duration.

4. The combination of claim 2, wherein, in response to interruption of the line voltage by the line control module, the underwater light selects and executes one of a plurality of light show programs stored in a memory of the underwater light.

5. The combination of claim 2, wherein one of the specified time periods corresponds to a command to set an intensity of light output by the underwater light or a command to set a rate at which an underwater light cycles through a light show.

6. The combination of claim 2, wherein a command issued to the underwater light by the line control module corresponds to one or more of a pre-defined number of power interruptions or a specified time period of a power interruption.

7. The combination of claim 2, wherein the line control module issues a command to the underwater light to drive light emitting diodes according to an intensity setting or to cycle through colors of a light show program at a specified rate.

8. The combination of claim 2, further comprising a preview circuit configured to output a preview of a light show.

9. The line control module of claim 1, wherein, in response to interruption of the line voltage by the line control module, the underwater light selects and executes one of a plurality of light show programs stored in a memory of the underwater light.

10. The line control module of claim 1, wherein one of the specified time periods corresponds to command to set an intensity of light output by the underwater light or a command to set a rate at which an underwater light cycles through a light show.

11. The line control module of claim 1, wherein a command issued to the underwater light by the line control module corresponds to a pre-defined number of power interruptions or a specified time period of a power interruption.

12. The line control module of claim 1, wherein the line control module issues a command to the underwater light to drive light emitting diodes according to an intensity setting or to cycle through colors of a light show program at a specified rate.

13. The line control module of claim 1, further comprising a preview circuit configured to output a preview of a light show.

14. The line control module of claim 1, further comprising:
   a rotary encoder having a shaft and a push button switch; and
   indicator light emitting diodes encircling the shaft of the rotary encoder,
   wherein the indicator light emitting diodes are energized and de-energized in response to rotation of the shaft.

* * * * *